United States Patent
Hawley-Weld et al.

(10) Patent No.: US 10,785,928 B2
(45) Date of Patent: Sep. 29, 2020

(54) METHODS SYSTEMS AND APPARATUS FOR CULTIVATING DENSELY SEEDED CROPS

(71) Applicant: EDEN WORKS, INC., Brooklyn, NY (US)

(72) Inventors: Nico Hawley-Weld, Brooklyn, NY (US); Matthew Larosa, Brooklyn, NY (US); Aftab Alam, Brooklyn, NY (US); Rachel Klepner, Brooklyn, NY (US); Dan Volpe, Brooklyn, NY (US); Ben Silverman, Brooklyn, NY (US)

(73) Assignee: EDEN WORKS, INC., Brooklyn, NY (US)

( * ) Notice: Subject to any disclaimer, the term of this patent is extended or adjusted under 35 U.S.C. 154(b) by 0 days.

(21) Appl. No.: 16/432,444

(22) Filed: Jun. 5, 2019

(65) Prior Publication Data

US 2019/0281778 A1    Sep. 19, 2019

Related U.S. Application Data

(63) Continuation of application No. PCT/US2017/065647, filed on Dec. 11, 2017.
(Continued)

(51) Int. Cl.
| | |
|---|---|
| *A01G 31/06* | (2006.01) |
| *A01G 9/029* | (2018.01) |
| *A01G 31/02* | (2006.01) |

(52) U.S. Cl.
CPC .......... *A01G 31/06* (2013.01); *A01G 9/0293* (2018.02); *A01G 9/0295* (2018.02); *A01G 31/02* (2013.01); *Y02P 60/216* (2015.11)

(58) Field of Classification Search
CPC ..... A01G 9/0293; A01G 9/0295; A01G 31/02
See application file for complete search history.

(56) References Cited

U.S. PATENT DOCUMENTS

| | | | |
|---|---|---|---|
| 2,175,113 A | 10/1939 | Fischer | |
| 2,867,946 A * | 1/1959 | Kobs | A01G 9/0295 |
| | | | 47/58.1 R |

(Continued)

FOREIGN PATENT DOCUMENTS

| | | |
|---|---|---|
| EP | 2 326 162 B1 | 6/2011 |
| EP | 2 540 156 A1 | 1/2013 |

(Continued)

OTHER PUBLICATIONS

Automation/Mechanization. Hydronov Inc. Accessed at http://web.archive.org/web/20100616042617/http:/www.hydronov.com/2010/English/E-02-003.htm, Jun. 6, 2010, 1 page.

(Continued)

*Primary Examiner* — Magdalena Topolski
(74) *Attorney, Agent, or Firm* — Smith Baluch LLP

(57) ABSTRACT

A horticultural raft includes a raft body, at least one top cavity, and a group of mid cavities. The top cavity includes an upper face defining a first projected area and a lower face defining a second projected area substantially equal to or less than the first projected area. The upper face provides a seeding pattern having one or two degrees of freedom in a growing medium disposed in the top cavity. Each mid cavity has an upper face defining a third projected area that is entirely contained within the second projected area. The mid cavities are configured to contribute to buoyancy of the floating horticultural raft, allow germinants in the growing medium to communicate via capillary action with a nutrient solution when the raft is floating in the nutrient solution, and mitigate hyperhydration and asphyxiation at respective root-stem junctions of the germinants.

28 Claims, 15 Drawing Sheets

Related U.S. Application Data

(60) Provisional application No. 62/432,354, filed on Dec. 9, 2016.

(56) References Cited

U.S. PATENT DOCUMENTS

| | | | |
|---|---|---|---|
| 2,893,168 A * | 7/1959 | Kobs | A01G 9/0295 47/73 |
| 2,988,441 A | 6/1961 | Pruitt | |
| 3,142,133 A * | 7/1964 | Brooks | A01G 9/0295 47/73 |
| 3,502,241 A | 3/1970 | Smith | |
| 3,561,158 A | 2/1971 | Marcan | |
| 3,667,159 A | 6/1972 | Todd | |
| 3,751,852 A | 8/1973 | Schrepper | |
| 3,755,964 A | 9/1973 | Rack | |
| 3,798,836 A | 3/1974 | Rubens et al. | |
| 3,823,508 A | 7/1974 | Takehara | |
| 3,927,491 A | 12/1975 | Farnsworth | |
| 3,931,694 A | 1/1976 | Krikorian | |
| 4,034,506 A | 7/1977 | Kasahara et al. | |
| 4,175,355 A | 11/1979 | Dedolph | |
| 4,312,152 A | 1/1982 | Drury et al. | |
| 4,355,484 A | 10/1982 | Mandish | |
| 4,382,348 A | 5/1983 | Kitsu et al. | |
| 4,407,092 A * | 10/1983 | Ware | A01G 31/02 47/64 |
| 4,495,725 A | 1/1985 | Talbott | |
| 4,586,288 A * | 5/1986 | Walton | A01H 4/001 47/73 |
| 4,597,222 A | 7/1986 | Roode | |
| 4,607,454 A | 8/1986 | Koike | |
| 4,769,946 A | 9/1988 | de Groot et al. | |
| 4,793,096 A | 12/1988 | Todd, Sr. | |
| 4,930,253 A | 6/1990 | Todd, Sr. | |
| 5,121,955 A | 6/1992 | Visser | |
| 5,261,185 A | 11/1993 | Koide et al. | |
| 5,324,657 A | 6/1994 | Tanny | |
| 5,435,098 A | 7/1995 | Koide et al. | |
| 5,481,825 A * | 1/1996 | Aoyama | A01G 9/045 47/18 |
| 5,657,577 A * | 8/1997 | Rodder | A01G 31/02 47/64 |
| 5,664,369 A | 9/1997 | Kertz | |
| 5,890,318 A | 4/1999 | Hammerle | |
| 5,934,018 A | 8/1999 | Thomas | |
| 5,979,111 A | 11/1999 | Brown et al. | |
| 6,237,286 B1 | 5/2001 | Williames | |
| 6,508,033 B2 | 1/2003 | Hessel et al. | |
| 6,851,221 B2 | 2/2005 | Layt et al. | |
| 6,918,206 B2 | 7/2005 | Schuck | |
| 7,320,197 B2 * | 1/2008 | Meyer | A01G 9/02 47/59 R |
| 7,845,114 B2 | 12/2010 | Kirtz et al. | |
| 8,145,330 B2 | 3/2012 | Emoto | |
| 8,151,517 B2 | 4/2012 | Emoto | |
| 8,234,814 B2 | 8/2012 | Kertz | |
| 8,533,992 B2 | 9/2013 | Harwood | |
| 8,671,616 B2 | 3/2014 | Kennedy | |
| 8,707,620 B2 | 4/2014 | Miller et al. | |
| 8,731,734 B2 | 5/2014 | Hage | |
| 8,910,418 B2 | 12/2014 | Khoo | |
| 9,010,022 B2 | 4/2015 | Brusatore | |
| 9,032,664 B2 | 5/2015 | Yusibov et al. | |
| D741,217 S | 10/2015 | Kernahan | |
| D744,371 S | 12/2015 | Lucey et al. | |
| 9,220,206 B2 | 12/2015 | Walliser | |
| 9,241,453 B1 | 1/2016 | Martin et al. | |
| 9,357,714 B2 | 6/2016 | Van Der Knaap et al. | |
| 9,565,812 B2 | 2/2017 | Wilson | |
| 9,603,316 B1 | 3/2017 | Mansey et al. | |
| 9,609,811 B2 | 4/2017 | Saumweber et al. | |
| 9,668,434 B2 | 6/2017 | Kernahan | |
| 9,693,512 B2 | 7/2017 | Chen et al. | |
| 9,730,397 B2 | 8/2017 | Houweling et al. | |

| | | | |
|---|---|---|---|
| 2004/0049980 A1 | 3/2004 | Principe et al. | |
| 2004/0118730 A1 | 6/2004 | Kennedy | |
| 2006/0053691 A1 | 3/2006 | Harwood et al. | |
| 2007/0209277 A1 | 9/2007 | Schuck et al. | |
| 2008/0120903 A1 | 5/2008 | Fair et al. | |
| 2009/0107039 A1 | 4/2009 | Kania et al. | |
| 2009/0119987 A1 * | 5/2009 | Ingrassia | A01G 9/0295 47/66.5 |
| 2010/0126063 A1 | 5/2010 | Emoto | |
| 2011/0252705 A1 | 10/2011 | Van Gemert | |
| 2012/0023821 A1 | 2/2012 | Kao | |
| 2014/0017043 A1 | 1/2014 | Hirai | |
| 2014/0115960 A1 | 5/2014 | Kantola et al. | |
| 2014/0155958 A1 | 6/2014 | Dong et al. | |
| 2014/0165467 A1 * | 6/2014 | DeYoung | A01G 9/045 47/87 |
| 2014/0318012 A1 | 10/2014 | Fujiyama | |
| 2014/0325908 A1 | 11/2014 | Farris | |
| 2014/0325909 A1 | 11/2014 | Farris | |
| 2014/0352211 A1 | 12/2014 | Liotta | |
| 2014/0366443 A1 | 12/2014 | Brusatore | |
| 2015/0000192 A1 | 1/2015 | Jönsson | |
| 2015/0005964 A1 | 1/2015 | Liotta | |
| 2015/0113875 A1 | 4/2015 | Liotta | |
| 2015/0150202 A1 | 6/2015 | Hessel et al. | |
| 2015/0237810 A1 | 8/2015 | Van Gemert et al. | |
| 2015/0282437 A1 | 10/2015 | Ohara et al. | |
| 2015/0342133 A1 | 12/2015 | Nakajima et al. | |
| 2016/0014977 A1 | 1/2016 | Esaki et al. | |
| 2016/0021836 A1 | 1/2016 | Kernahan | |
| 2016/0028442 A1 | 1/2016 | Kernahan | |
| 2016/0128289 A1 | 5/2016 | Wong et al. | |
| 2016/0135396 A1 | 5/2016 | Day | |
| 2016/0157447 A1 | 6/2016 | Hanzawa et al. | |
| 2016/0235018 A1 | 8/2016 | Motoyama et al. | |
| 2016/0242372 A1 | 8/2016 | Wong et al. | |
| 2016/0255781 A1 | 9/2016 | Chen et al. | |
| 2016/0270303 A1 | 9/2016 | Cooley et al. | |
| 2016/0270310 A1 | 9/2016 | Botman | |
| 2016/0295820 A1 | 10/2016 | Aykroyd et al. | |
| 2016/0338272 A1 | 11/2016 | Hage et al. | |
| 2016/0345518 A1 | 12/2016 | Collier et al. | |
| 2016/0353672 A1 | 12/2016 | Hoffman | |
| 2016/0366838 A1 | 12/2016 | Hanzawa et al. | |
| 2016/0366845 A1 | 12/2016 | Visser et al. | |
| 2017/0027110 A1 | 2/2017 | Ito et al. | |
| 2017/0027112 A1 | 2/2017 | Vail et al. | |
| 2017/0049064 A1 | 2/2017 | Griffin | |
| 2017/0051924 A1 | 2/2017 | Saumweber et al. | |
| 2017/0055460 A1 | 3/2017 | Brusatore | |
| 2017/0127627 A1 | 5/2017 | Miyabe et al. | |
| 2017/0127628 A1 | 5/2017 | Miyabe et al. | |
| 2017/0127629 A1 | 5/2017 | Miyabe et al. | |
| 2017/0188531 A1 | 7/2017 | Daniels | |
| 2017/0196176 A1 | 7/2017 | Griffin | |
| 2018/0042192 A1 | 2/2018 | Volpe et al. | |

FOREIGN PATENT DOCUMENTS

| | | |
|---|---|---|
| GB | 2 014 836 | 9/1979 |
| JP | 2006-262750 A | 10/2006 |
| JP | 2009-011232 A | 1/2009 |
| JP | 2009-106208 A | 5/2009 |
| JP | 5095348 B2 | 12/2012 |
| JP | 2013-179906 A | 9/2013 |
| JP | 5290241 B2 | 9/2013 |
| JP | 2014-064522 A | 4/2014 |
| JP | 2014-168420 A | 9/2014 |
| JP | 2014-198003 A | 10/2014 |
| JP | 2015-035974 A | 2/2015 |
| JP | 5713758 B2 | 5/2015 |
| JP | 5761821 B2 | 8/2015 |
| JP | 2015-211658 A | 11/2015 |
| JP | 2015-213438 A | 12/2015 |
| JP | 2016-013107 A | 1/2016 |
| JP | 2017-212939 A | 6/2016 |
| JP | 5994162 B1 | 9/2016 |
| JP | 5994163 B1 | 9/2016 |
| JP | 2016-202110 A | 12/2016 |

(56) References Cited

FOREIGN PATENT DOCUMENTS

| | | |
|---|---|---|
| JP | 2017-018149 A | 1/2017 |
| JP | 6084827 A2 | 2/2017 |
| JP | 2017-042055 A | 3/2017 |
| JP | 6106315 B1 | 3/2017 |
| KR | 10-2016-0014876 A | 2/2016 |
| NL | 1011346 C1 | 3/1999 |
| NL | 1020867 C2 | 1/2004 |
| WO | WO 83/018888 | 6/1983 |
| WO | WO 96/35326 A1 | 11/1996 |
| WO | WO 2004/043829 A2 | 5/2004 |
| WO | WO 2007/058062 A1 | 5/2007 |
| WO | WO 2009/066991 A2 | 5/2009 |
| WO | WO 2011/013892 A2 | 2/2011 |
| WO | WO 2011/080819 A1 | 7/2011 |
| WO | WO 2011/118550 A1 | 9/2011 |
| WO | WO 2012/005121 A1 | 1/2012 |
| WO | WO 2012/067499 A1 | 5/2012 |
| WO | WO 2012/118159 A1 | 9/2012 |
| WO | WO 2013/018460 A1 | 2/2013 |
| WO | WO 2013/072990 A1 | 5/2013 |
| WO | WO 2014/148654 A1 | 9/2014 |
| WO | WO 2014/192331 A1 | 12/2014 |
| WO | WO 2015/002529 A2 | 1/2015 |
| WO | WO 2015/045045 A1 | 4/2015 |
| WO | WO 2015/082924 A1 | 6/2015 |
| WO | WO 2015/107697 A1 | 7/2015 |
| WO | WO 2016/138075 A1 | 9/2016 |
| WO | WO 2016/166311 A1 | 10/2016 |
| WO | WO 2016/181699 A1 | 11/2016 |
| WO | WO 2016/207900 A1 | 12/2016 |
| WO | WO 2017/012644 A1 | 1/2017 |
| WO | WO 2017/024079 A2 | 2/2017 |
| WO | WO 2017/024353 A1 | 2/2017 |
| WO | WO 2017/041757 A1 | 3/2017 |
| WO | WO 2017/042891 A1 | 3/2017 |
| WO | WO 2017/047186 A1 | 3/2017 |
| WO | WO 2017/062918 A1 | 4/2017 |
| WO | WO 2017/098776 A1 | 6/2017 |

OTHER PUBLICATIONS

Bedda, City Farming. SlideShare Dec. 16, 2014. Accesseed at https://www.slideshare.net/anis_bedda/gus-van-der-feltz-phlips-city-farming, 14 pages.
Beijing builds a plant factory. People's Dialy Online. Aug. 24, 2010. Accessed at http://en.people.cn/90001/90776/90882/7115437.html, 2 pages.
Cnet. Accessed at https://www.cnet.com/pictures/the-future-of-farming-local-organic-and-high-tech/, May 27, 2017, 39 pages.
Controlled Environment Agriculture. Vertical Farm Systems Jan. 26, 2014. Accessed at http://web.archive.org/web/20140628155802/http:/www.verticalfarms.com.au/sites/default/files/XA-Brochure.pdf, 4 pages.
Dry Hydroponics VISCON EU. YouTube May 9, 2014. Accessed at https://www.youtube.com/watch?v=wHQqtL3g-pE&t=9s, 3 pages.
Dry Hydroponics, "The Dry Hydroponics System," Accessed Dec. 2, 2016, http://www.dryhydroponics.nl/index.php/en/system, 6 pages.
EcoGROW, accessed at http://web.archive.org/web/20140908181950/http:/www.ecogrow.ca/intro.html, Sep. 8, 2014, 1 page.
Epstein, D., "ALT Air Layer Technique is a Deep Water Culture Hybrid," Bioponica 2015. Accessed Dec. 2, 2016, 4 pages.
Extreem farming. feeding the planet. Image 6/81. ASA Contiendos 2012. Accessed at http://www.asa-agency.com/en/-/galleries/asa-imagenes/asa-fotografos/steinmetz-george/medioambiente/ganaderia-extrema-alimentando-al-planeta/-/medias/457fa4eb-7079-4596-bf45-795cdd04e1e5-left-over-aeroponic-salad-is-scraped-from-fleece-like-fabric-b, 1 page.
Fry, Green for greens: Bowery, though a newcomer to indoor vertical farming, has won over some big-name backers for its Kearny operation. NJBIZ, May 1, 2017. Accessed at http://www.njbiz.com/article/20170501/njbiz01/170509975/green-for-greens-bowery-though-a-newcomer-to-indoor-vertical-farming-has-won-over-some-bigname-backers-for-its-kearny-operation, 3 pages.
Garfield, The world's first robot-run farm will harvest 30,000 heads of lettuce daily. Business Insider Jan. 28, 2016. Accessed at http://www.businessinsider.com/spreads-robot-farm-will-open-soon-2016-1, 3 pages.
George, E. F. et al. (2008) The Components of Plant Tissue Culture Media II: Organic Additions, Osmotic and pH Effects, and Support Systems. In: George E.F., Hall M.A., Klerk GJ.D. (eds) Plant Propagation by Tissue Culture. Springer, Dordrecht, pp. 115-173.
Green Automation Export 2013, Finnish gutter system achieves outstanding production numbers, "900 crops of lettuce per squaremeter, and only 4 laborers per hectare," http:www.hortidaily.com/print.asp?id=1177, 3 pages.
GreenCube Vertical Cultivation System. Logiqs Mar. 20, 2016. Accessed at http://web.archive.org/web/20160320022344/https:/www.logiqs.nl/en/greencube, 2 pages.
Growing Phase on Deep Water. Viscon Hydroponics Mar. 7, 2016. Accessed at http://web.archive.org/web/20160307005136/http:/www.visconhydroponics.eu:80/production-on-deep-water/, 1 page.
Gupta, S. D. et al. (2010) Matrix Supported Liquid Culture and Machine Vision Analysis of Regenerated Shoots of Gladiolus. In: Jain S., Ochatt S. (eds) Protocols for In Vitro Propagation of Ornamental Plants. Methods in Molecular Biology (Methods and Protocols), vol. 589. Humana Press, pp. 487-495.
Hall, Farming of the future: Toshiba's 'clean' factory farm where three million bags of lettuce are grown without sunlight OR soil. Daily Mail Nov. 12, 2014. Accessed at http://www.dailymail.co.uk/sciencetech/article-2831841/Farming-future-Toshiba-s-clean-factory-farm-three-million-bags-lettuce-grown-without-sunlight-soil.html, 56 pages.
High Density Baby Greens Growing System. YouTube Jul. 29, 2014. Accessed at https://www.youtube.com/watch?v=SfMTK9Jblck, 3 pages.
Hydroponics. GrowUp Urban Farms Nov. 15, 2015. Accessed at http://web.archive.org/web/20151116091809/http:/growup.org.uk:80/all-posts/photos-and-videos/gallery/unit-84/hydroponics/, 3 pages.
IFAIR—Indoor Farm Air. Indoor Harvest. Accessed at http://web.archive.org/web/20160130151853/https:/indoorharvest.com/products/ifair-indoor-farm-air, Jan. 30, 2016, 5 pages.
Ignaczak, Artesian Farm Blossoms in Brightmoor. Edible Wow, Mar. 1, 2016. Accessed at http://ediblewow.ediblecommunities.com/shop/artesian-farms-blossoms-brightmoor, 2 pages.
In Pictures: Fish and edible greens thrive in urban aquaponics venture. Accessed at https://beta.theglobeandmail.com/report-on-business/small-business/sb-growth/the-challenge/in-pictures-fish-and-greens-help-each-other-thrive-in-urban-aquaponics-farm/article30219840/, Jun. 1, 2016, 8 pages.
International Search Report and Written Opinion dated Jul. 17, 2017 from International Application No. PCT/US2017/028999, 16 pages.
International Search Report and Written Opinion dated Feb. 14, 2018 from International Application No. PCT/US2017/065647, 12 pages.
Jensen, M. H., "Deep Flow Hydroponics—Past, Present and Future," Controlled Environment Agriculture Center, University of Arizona, Tucson, AZ, 2002, 7 pages.
Laylin, VertiCrop Processes 10,000 Plants Every 3 Day Using Vertical Hydroponic Farming. Inhabitat Jun. 13, 2014. Accessed at https://inhabitat.com/verticrop-processes-10000-plants-every-3-days-using-vertical-hydroponic-farming/, 10 pages.
Lindeman, With new growing tecniques, small, urban facilities can replace acres of farmland. The Globe and Mail. Aug. 22, 2016. Accessed at https://beta.theglobeandmail.com/report-on-business/small-business/sb-growth/agriculture-tech-companies-look-to-the-future-offarming/article31443097/, 3 pages.
Local by Atta rebuilds vertical farm with GE LEDs after devastating fire. Hort Americas Aug. 16, 2017. Accessed at http://hortamericas.com/horti-facts-case-studies/local-by-atta-rebuilds-vertical-farm-with-ge-leds-after-devastating-fire/, 3 pages.
McCormic, Vertical farm can make 44,000 pounds of tomatoes on the side of a parking lot. The Verge Feb. 26, 2015. Accessed at https://www.theverge.com/2015/2/26/8112889/vertical-farm-wyoming-hydroponics-grow-food, 3 pages.

(56) References Cited

OTHER PUBLICATIONS

Nagata, Future appears bright for indoor veggie farms. The Japan Times Aug. 11, 2014. Accessed at https://www.japantimes.co.jp/news/2014/08/11/business/tech/future-appears-bright-indoor-veggie-farms/, 2 pages.
Newgren, Urban Organics: Providing Local Year-Round Produce. Minnesota Connected Apr. 9, 2014. Accessed at http://minnesotaconnected.com/lifestyle/food/urban-organics-providing-local-year-round-produce_209265/, 3 pages.
Nijs, Belgium: Urban Crops opens largest automated plant factory in Europe. Hortidaily Feb. 26, 2016. Accessed at http://www.hortidaily.com/article/24546/Belgium-Urban-Crops-opens-largest-automated-plant-factory-in-Europe, 3 pages.
Nussbaumer, Buffalo's Vertical Fresh Farms. Buffalo Rising Mar. 28, 2015. Accessed at https://www.buffalorising.com/2015/03/buffalos-vertical-fresh-farms/, 4 pages.
Plant Plant Fully artifical light-type growing systems from Mitsubishi chemical. Accessed at http://web.archive.org/web/20141203041922/http:/www.plantplant.jp/en/solution/index.html, Dec. 3, 2014, 1 page.
Plantfactory. Urban Crop Solution Feb. 26, 2016. Accessed at http://web.archive.org/web/20170610231947/https:/urbancropsolutions.com/farm-systems/plant-factory/, 3 pages.
Potenza, In a Brooklyn aquaponic farm, basil grown with tilapia is the future. The Verge. Jun. 15, 2015. Accessed at https://www.theverge.com/2016/6/15/11937882/verticulture-aquaponic-farm-brooklyn-fish-poop-fertilizer, 3 page.
Project Deliscious. Certhon Greenhouse Solutions Oct. 1, 2016. Accessed at http://web.archive.org/web/20161001210454/http:/www.certhon.com/en/projects/deliscious, 16 pages.
RoBotany: LaunchCMU Spring 2017. YouTube Jun. 12, 2017. Accessed at https://www.youtube.com/watch?v=spTmJ7rzUCA, 3 pages.
Sahib Aquaponics 2011. "Aquaponics news-update. Sahib replaces NFT's in Phase I with Vertical Shallow Water Culture (SWC)." https://www.sahibaquaponics.com/project-news/sahib-replaces-nfts-in-phase-i-with-vertical-shallow-water-culture-swc/, 6 pages.
Scatil. Facebook Mar. 20, 2015. Accessed at https://www.facebook.com/SCATIL/photos/a.476702992479905.1073741827.476577912492413/476700769146794/?type=3&theater, 1 page.
Sechler, Toronto Aquaponics Startup Works Toward a 'New Normal' in Local Food Production. Accessed at http://seedstock.com/2015/03/02/toronto-aquaponics-startup-works-toward-a-new-normal-in-local-food-production/, Mar. 2, 2015, 2 pages.
Sherman, The farm of the future is right here in Philadelphia. Technically Philly Feb. 3, 2016. Accessed at https://technical.ly/philly/2016/02/03/metropolis-farms-south-philly-vertical-farming/, 4 pages.
Spread 2016, "Business strategy—the potential of plant factories," http://spread.co.jp/en/strategy/, 2 pages.
Spread 2016, The Guardian. "Japanese firm to open world's first robot-run farm," http://www.theguardian.com/environment/2016/feb/01/japanese-firm-to-open-worlds-first-robot-run-farm, 8 pages.
Techno Farm. Indoor Vertical Farming. Spread Co., LTD. Youtube Dec. 20, 2017. Accessed at https://www.youtube.com/watch?v=gEfyPlyJfKA***.
The Minister of industry of Thailand visit Kingpeg R&D Center in Chiuna—Facility Agriculture from Kingpeng to the World! Kingpeng Dec. 9, 2016. Accessed at http://www.kingpengintl.com/news/the-minister-of-industry-of-thailand-visit-kin-3276895.html, 2 pages.
TranSystem 2013, "Rules of thumb-warehousing and distribution guidelines," 11th Edition, 2010, http://www.werc.org/assets/1/Publications/TranSystems%20Rules%20of%20Thumb%202010%20v2.pdf, 7 pages.
TruLeaf—Company video. YouTube Nov. 9, 2015. Accessed at https://www.youtube.com/watch?v=9OgyX8AWeQY, 3 pages.
Ulrich, K., "The role of product architecture in the manufacturing firm," *Research Policy* 24, pp. 419-440 (1995).
Urban Crops wins at Gault & Millau's Culinary Innovators Awards. Hortidaily May 13, 2016. Accessed at http://www.hortidaily.com/article/26188/Urban-Crops-wins-at-Gault-&-Millau%E2%80%99s-Culinary-Innovators-Awards, 3 pages.
Urban Vertical Farming. Agrivolution 2014. Accessed at http://web.archive.org/web/20150727185720/http:/agrivolution.co/v014/index.html, 1 page.
Vertical Farming Taking Root in Pennsylvania. Public News Service Jul. 24, 2014. Accessed at http://www.publicnewsservice.org/2014-07-24/rural-farming/vertical-farming-taking-root-in-pennsylvania/a40740-1, 2 pages.
VertiCulture. Facebook Mar. 27, 2015. Accessed at https://www.facebook.com/verticulturefarms/photos/a.658890117548608.1073741826.178954308875527/658890134215273/?type=3&theater, 1 page.
Zimmer, Philips uses LEDs to bolser urban farming. Inhabitat Mar. 24, 2015. Accessed at https://inhabitat.com/philips-uses-leds-to-bolster-urban-farming/, 12 pages.

* cited by examiner

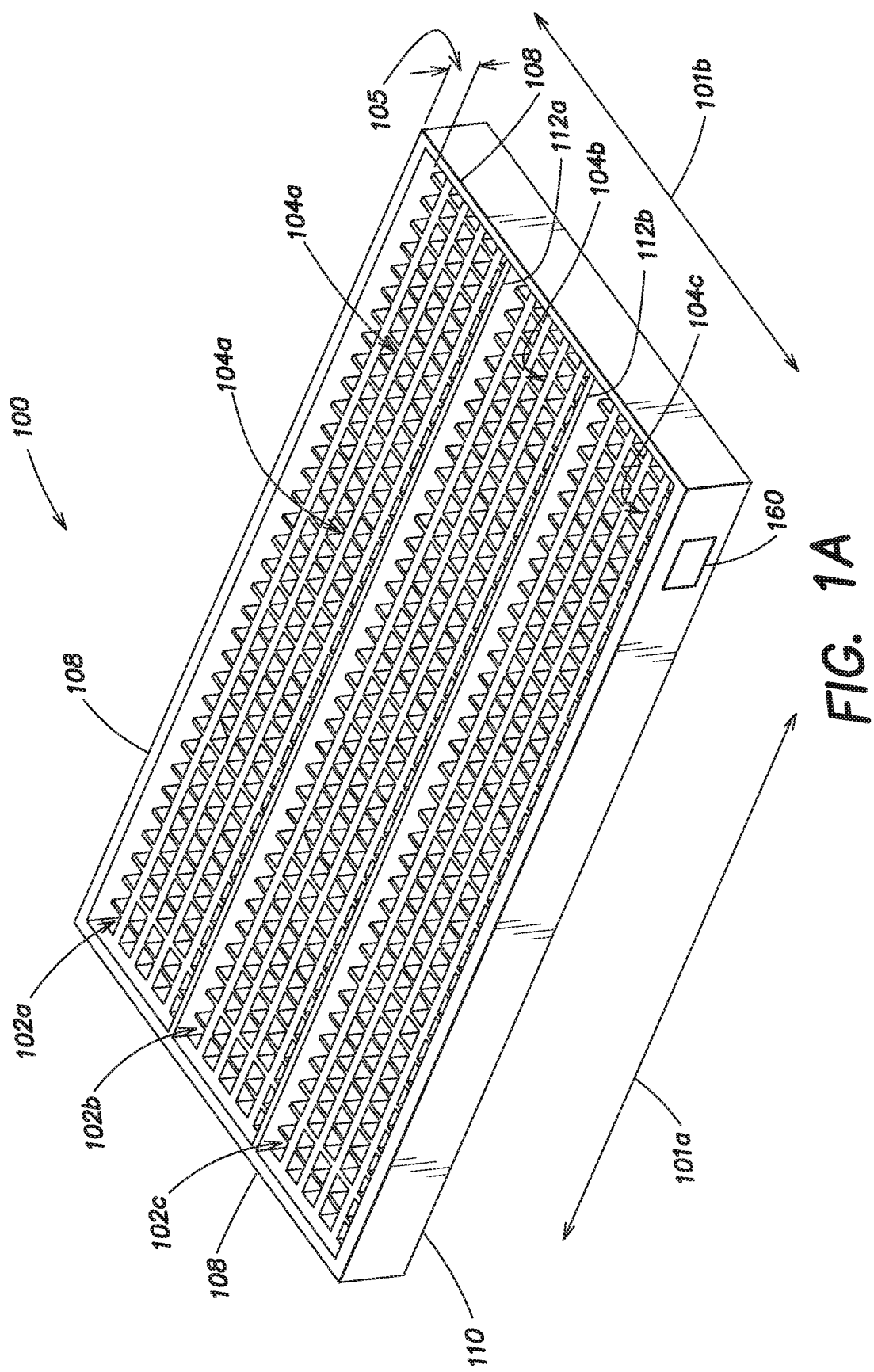

METHODS SYSTEMS AND APPARATUS FOR CULTIVATING DENSELY SEEDED CROPS

CROSS-REFERENCES TO RELATED APPLICATIONS

This application is a bypass continuation application of International PCT Application PCT/US2017/065647, filed on Dec. 11, 2017, entitled "METHODS SYSTEMS AND APPARATUS FOR CULTIVATING DENSELY SEEDED CROPS," which claims priority to U.S. Application No. 62/432,354, filed Dec. 9, 2016, entitled "FLOATING RAFTS WITH REINFORCED BEDS OR FURROWS FOR CULTIVATING DENSELY SEEDED CROPS," which application is hereby incorporated herein by reference in its entirety.

BACKGROUND

Young leafy crops, such as baby greens and microgreens, are unique in that, unlike larger crops, they can be seeded at very high densities without being transplanted or respaced during their lifespan.

In deep or shallow water floating raft culture, floating rafts are used as horticultural containers. Rafts are placed atop large recirculating ponds of nutrient-rich water (a "nutrient solution"), and plant roots of germinants are allowed to come in contact with the nutrient solution, either directly or via a porous, hydraulically conductive medium. The rafts provide not only a means of irrigation and nutrient delivery, but also an inexpensive and near-frictionless means of conveying the plants across a growing area for the purposes of seeding, transplanting, and harvesting. Such conveyance can be advantageous for younger crops, as the conveyance usually occurs at a frequency inversely proportional to the crop's harvest age.

Traditional horticultural rafts usually have several challenges in producing young, densely seeded crops in floating raft culture. For example, celled tray rafts, which provide a single compartment for each plant, can be employed for seedlings meant for individual sale (e.g. tobacco, cauliflower transplant, or head lettuce production). However, they typically do not allow flexibility in different seeding patterns that may be used for young leafy crops.

In another example, rafts with long tapered furrows rather than cells afford greater flexibility in seeding density (along the single dimension of a given furrow), but they are structurally constrained due to the strength reduction induced by the open furrows. These structural constraints include limits to the width, length, orientation, and spacing of furrows, as well as limits to the size of the raft itself. Practically, due to these structural constraints, tapered furrows must be extremely narrow (suboptimal for root health) and broken up by empty space rather than extending the entire length or width of the raft (resulting in loss of yield). In addition, tapered furrows usually span widthwise rather than lengthwise across the raft. In a seeding line, it can be desirable for furrows to be oriented along the axis the raft travels (e.g., to enable a variable-rate seeding density along the axis of the furrows), which is almost always the long axis of the raft for conveyance and handling reasons. However, in a harvesting line, this lengthwise spanning may result in substantial flexion of the raft, resulting in an uneven cut of plant shoots because the raft is held on its sides. Thus, tradeoffs must be made between the length, width, spacing, and orientation of furrows, resulting in suboptimal operating costs and/or yields.

SUMMARY

The Inventors have recognized and appreciated that, when seeding young leafy crops in horticultural containers, there are certain advantages to having flexibility in the types of seeding patterns that may be employed for germinants, while simultaneously being parsimonious with a growing medium in which the germinants are placed. In view of the foregoing, various inventive implementations disclosed herein relate generally to apparatus for cultivating densely seeded crops that provide for dense seeding patterns in one or two dimensions, together with an economical use of growing medium. In respective examples discussed in detail below, such apparatus are implemented as horticultural containers which, in some instances, may be constructed with buoyant features such that the containers may serve as rafts that float in a nutrient solution. More specifically, horticultural rafts or carriers with buoyant features allow for the efficient cultivation of densely seeded crops by means of deep or shallow water floating raft culture. In some examples, raft designs include furrows and/or beds to contain a growing medium and germinants, and such rafts may serve as constituent elements of a material handling architecture for an indoor hydroponic farm. As constituent elements of such an architecture, the rafts or horticultural containers disclosed here serve as the physical interface between the organisms being cultivated (e.g. plants or fungi) and the automation and handling systems in the architecture.

In one inventive example, a horticultural raft comprises a rigid, buoyant, reusable raft body including a system of open cavities, at least some of which are configured to contain a porous horticultural growing medium that is separable from the raft and that can be filled into and removed from its cavities. In some implementations, a top face of the raft includes one or more separate top cavities that are either topologically linear or topologically rectangular in nature, allowing for flexibility in seeding pattern along one or two axes. Each top cavity can be connected to a one-dimensional (e.g., linear) or two-dimensional (e.g., rectangular) pattern or grid of multiple mid cavities, disposed in a layer of the raft below the one or more top cavities. In one aspect, the porous growing medium fills each top cavity continuously, but the medium is broken up into individual compartments within the layer of mid cavities.

In other aspects, the layer of mid cavities serves to reduce the amount of growing medium otherwise required in conventional raft designs to obtain a thick porous medium layer for germinants. The mid cavities also substantially strengthen the raft body itself, provide additional structure for plant roots and growing medium to anchor against, and in some instances increase the buoyancy of the raft (e.g., without requiring an external buoyant frame). This enables furrows and beds to be implemented at any length, width, orientation, and spacing, and allows for the porous medium to be thick enough overall (at a combined vertical depth of the top cavity and mid cavities) to avoid or significantly mitigate plant tissue hyperhydration and asphyxiation while simultaneously facilitating a substantial reduction in growing medium use compared to conventional single-cavity furrows and beds.

In other inventive implementations, a material handling architecture in which horticultural rafts as described herein may be employed integrates the concepts of "vertical stacking," "flow-through," and "water as a conveyor," thereby providing a vertically stacked, flow-through, floating raft growing system, encompassing the growing area itself as well as the conveyance systems to and from pre-grow and post-grow processing areas. Additional details about vertically-stacked shallow-water flow systems can be found in PCT Application No. PCT/US2017/028999, filed Apr. 21, 2017, entitled "STACKED SHALLOW WATER CULTURE (SSWC) GROWING SYSTEMS, APPARATUS AND METHODS," which is hereby incorporated herein by reference in its entirety. It should be appreciated that, in other implementations, the horticultural containers described herein may be employed in other types of growing architectures or ecosystems (e.g., a flat greenhouse).

In one example, a horticultural raft includes a buoyant raft body having a top-facing non-seedbearing perimeter edge that defines a top face of the raft and at least a first top cavity (102a) in the buoyant raft body at the top face of the raft. The first top cavity includes a first top cavity upper face that includes at least a portion of the top face of the raft defined by the top-facing non-seedbearing perimeter edge. The first top cavity upper face has a first projected area. The first top cavity also has a first top cavity lower face having a second projected area. The second projected area is contained within or equal to the first projected area of the first top cavity upper face. The first top cavity also has a first depth, from the top-facing non-seedbearing perimeter edge to the first top cavity lower face, to contain at least one porous horticultural growing medium. The first top cavity upper face provides a seeding pattern in the at least one porous horticultural growing medium, when present in the first top cavity, having two degrees of freedom along the portion of the top face of the raft such that the first top cavity provides a growing bed. The raft also includes a first plurality of mid cavities in the buoyant raft body and coupled to the first top cavity so as to also contain the at least one porous horticultural growing medium. The first plurality of mid cavities is arranged as a two-dimensional pattern of individual compartments coupled to the first top cavity. A mid cavity upper face of each mid cavity of the first plurality of mid cavities has a third projected area that is entirely contained within the second projected area of the first top cavity lower face of the first top cavity. A mid cavity lower face of each mid cavity of the first plurality of mid cavities has a fourth projected area that is entirely contained within the third projected area of the mid cavity upper face. At least a first mid cavity of the first plurality of mid cavities has a second depth from a first upper face of the first mid cavity to a first lower face of the first mid cavity such that the first lower face of the first mid cavity contacts a nutrient solution when the raft is floating in the nutrient solution to allow germinants in the at least one porous horticultural growing medium, when present in the raft, to communicate via capillary action with the nutrient solution. The second depth of at least the first mid cavity provides a sufficient capillary distance between a safe seeding zone for the germinants in the at least one porous horticultural medium when present in the first top cavity of the raft and the nutrient solution when the raft is floating in the nutrient solution to sufficiently mitigate hyperhydration and asphyxiation at respective root-stem junctions of the germinants.

In another example, a horticultural raft includes a buoyant raft body having a top-facing non-seedbearing perimeter edge that defines a top face of the raft and at least a first top cavity in the buoyant raft body at the top face of the raft. The first top cavity includes a first top cavity upper face that includes at least a portion of the top face of the raft defined by the top-facing non-seedbearing perimeter edge. The first top cavity upper face has a first projected area. The first top cavity also includes a first top cavity lower face having a second projected area. The second projected area is contained within or equal to the first projected area of the first top cavity upper face. The first top cavity also includes a first depth, from the top-facing non-seedbearing perimeter edge to the first top cavity lower face, to contain at least one porous horticultural growing medium. The first top cavity upper face provides a seeding pattern in the at least one porous horticultural growing medium, when present in the first top cavity, having two degrees of freedom along the portion of the top face of the raft such that the first top cavity provides a growing bed. The raft also includes a first plurality of mid cavities in the buoyant raft body and coupled to the first top cavity so as to also contain the at least one porous horticultural growing medium. The first plurality of mid cavities is arranged as a two-dimensional pattern of individual compartments coupled to the first top cavity. A mid cavity upper face of each mid cavity of the first plurality of mid cavities has a third projected area that is entirely contained within the second projected area of the first top cavity lower face of the first top cavity. A mid cavity lower face of each mid cavity of the plurality of mid cavities has a fourth projected area that is entirely contained within the third projected area of the mid cavity upper face. At least some mid cavities of the first plurality of mid cavities include at least one vertical ridge protruding inwards along at least one interior side of the mid cavity. The raft further includes at least one air vent disposed in the raft body and at least one of a plurality of feet, a plurality of ridges and a plurality of nipples disposed on an underside of the raft body. The raft also includes a plurality of interlocking components coupled to the raft body to facilitate reversible interlocking of the raft to at least one other raft and a plurality of contact points disposed on the raft body to facilitate at least one of robotic and manual handling of the raft.

In yet another example, a horticultural raft includes a buoyant raft body (110) having a top-facing non-seedbearing perimeter edge that defines a top face of the raft and at least a first top cavity (102A) at the top face of the raft. The first top cavity has a first top cavity upper face that includes at least a portion of the top face of the raft defined by the top-facing non-seedbearing perimeter edge. The first top cavity upper face has a first projected area. The first top cavity also includes a first top cavity lower face having a second projected area and a first depth (105), from the top-facing non-seedbearing perimeter edge to the first top cavity lower face, to contain at least one porous horticultural growing medium. The first top cavity upper face provides a seeding pattern in the at least one porous horticultural growing medium, when present in the first top cavity, having one degree of freedom or two degrees of freedom along the portion of the top face of the raft. The raft also includes a plurality of mid cavities coupled to the first top cavity so as to also contain the at least one porous horticultural growing medium. A mid cavity upper face of each mid cavity of the plurality of mid cavities has a third projected area that is entirely contained within the second projected area of the first top cavity lower face of the first top cavity. The plurality of mid cavities are sized and arranged with respect to the first top cavity to: 1) contribute to buoyancy of the horticultural raft; 2) allow germinants in the at least one porous horticultural growing medium, when present in the raft, to communicate via capillary action with a nutrient solution when the raft is floating in the nutrient solution; and 3)

significantly mitigate hyperhydration and asphyxiation at respective root-stem junctions of the germinants.

In yet another example, a horticultural raft includes a raft body having a top-facing non-seedbearing perimeter edge that defines a top face of the raft and first means for containing at least one horticultural growing medium. The first means provides a seeding pattern in the at least one horticultural growing medium, when present in the raft, having one degree of freedom or two degrees of freedom along the portion of the top face of the raft. The raft also includes second means for containing the at least one horticultural growing medium. The second means: 1) allows germinants in the at least one horticultural growing medium, when present in the raft, to communicate via capillary action with a nutrient solution when the raft is floating in the nutrient solution; and 2) significantly mitigates hyperhydration and asphyxiation at respective root-stem junctions of the germinants.

In yet another example, a horticultural container includes a body having a top-facing non-seedbearing perimeter edge that defines a top face of the container and at least a first top cavity at the top face of the container. The first top cavity includes a first top cavity upper face that includes at least a portion of the top face of the container defined by the top-facing non-seedbearing perimeter edge. The first top cavity upper face has a first projected area. The first top cavity also includes a first top cavity lower face having a second projected area and a first depth, from the top-facing non-seedbearing perimeter edge to the first top cavity lower face, to contain at least one horticultural growing medium. The first top cavity upper face provides a seeding pattern in the at least one horticultural growing medium, when present in the first top cavity, having one degree of freedom or two degrees of freedom along the portion of the top face of the container. The container also includes a plurality of mid cavities coupled to the first top cavity so as to also contain the at least one porous horticultural growing medium. The plurality of mid cavities is arranged as a one-dimensional or two-dimensional pattern of individual compartments coupled to the first top cavity. A mid cavity upper face of each mid cavity of the first plurality of mid cavities has a third projected area that is entirely contained within the second projected area of the first top cavity lower face of the first top cavity. A mid cavity lower face of each mid cavity of the plurality of mid cavities has a fourth projected area that is entirely contained within the third projected area of the mid cavity upper face.

In yet another example, a kit includes at least one porous horticultural growing medium; and a horticultural raft. The raft includes a buoyant raft body having a top-facing non-seedbearing perimeter edge that defines a top face of the raft and at least a first top cavity at the top face of the raft. The first top cavity includes a first top cavity upper face that includes at least a portion of the top face of the raft defined by the top-facing non-seedbearing perimeter edge. The first top cavity upper face has a first projected area. The first top cavity also includes a first top cavity lower face having a second projected area and a first depth, from the top-facing non-seedbearing perimeter edge to the first top cavity lower face, to contain the at least one porous horticultural growing medium. The first top cavity upper face provides a seeding pattern in the at least one porous horticultural growing medium, when present in the first top cavity, having one degree of freedom or two degrees of freedom along the portion of the top face of the raft. The raft also includes a plurality of mid cavities coupled to the first top cavity so as to also contain the at least one porous horticultural growing medium. A mid cavity upper face of each mid cavity of the plurality of mid cavities has a third projected area that is entirely contained within the second projected area of the first top cavity lower face of the first top cavity. The plurality of mid cavities are sized and arranged with respect to the first top cavity to: 1) contribute to buoyancy of the horticultural raft; 2) allow germinants in the at least one porous horticultural growing medium, when present in the raft, to communicate via capillary action with a nutrient solution when the raft is floating in the nutrient solution; and 3) significantly mitigate hyperhydration and asphyxiation at respective root-stem junctions of the germinants.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 1A-1C show schematics of an apparatus providing for a seeding pattern having two degrees of freedom for cultivating densely seeded crops.

DETAILED DESCRIPTION

Figure 1B:
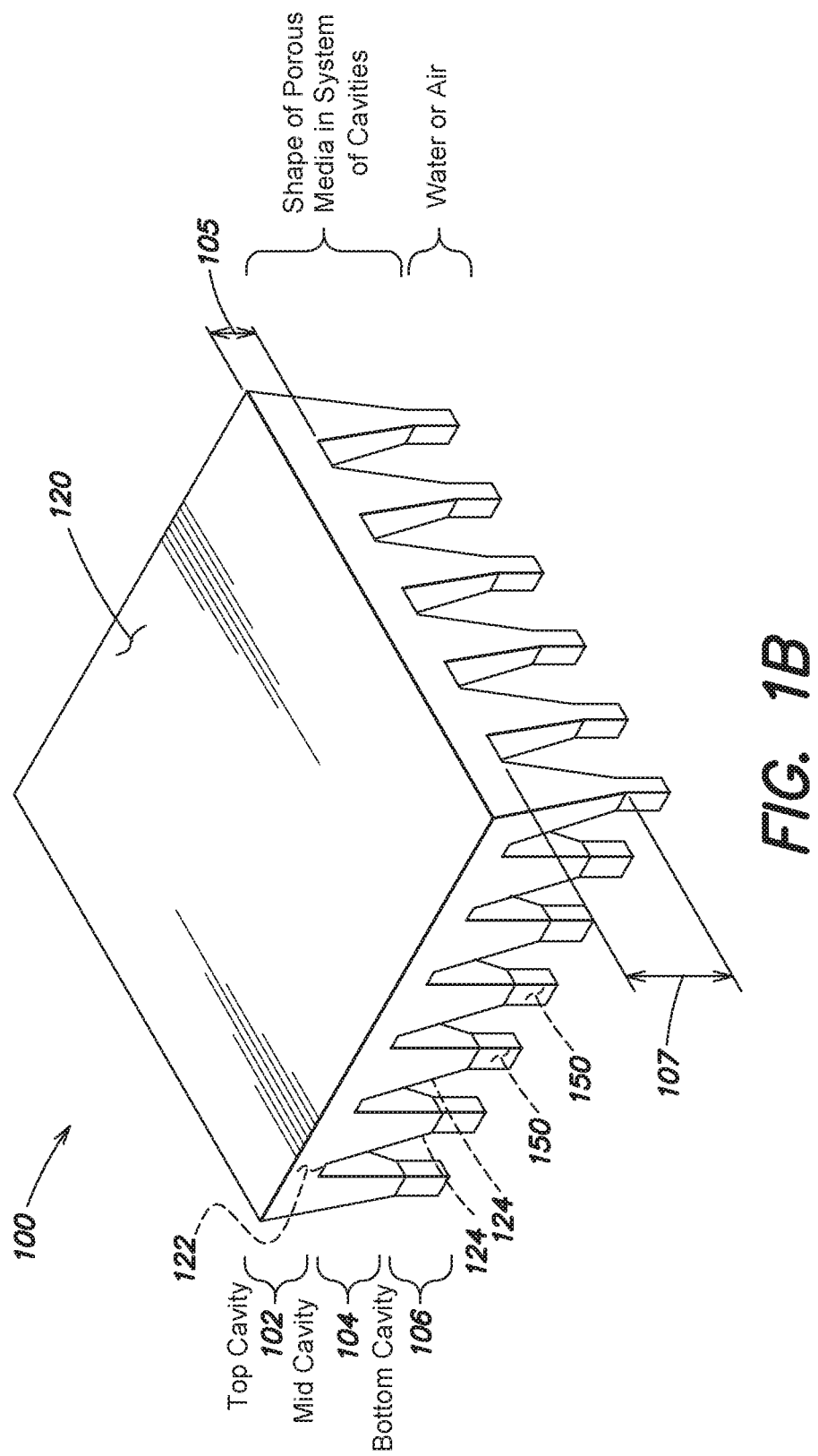

Following below are more detailed descriptions of various concepts related to, and embodiments of, inventive apparatus for cultivating densely seeded crops. It should be appreciated that various concepts introduced above and discussed in greater detail below may be implemented in numerous ways. Examples of specific implementations and applications are provided primarily for illustrative purposes.

Apparatus for Cultivating Densely Seeded Crops

As noted above, the Inventors have recognized and appreciated that conventional celled-tray horticultural containers as well as conventional containers with long tapered furrows lack flexibility and/or structural integrity in connection with providing increased seeding density, which is useful for young crops such as microgreens. Accordingly, in some aspects the horticultural container designs disclosed herein provide for more robust containers having seeding patterns along a single dimension (one degree of freedom) or along two-dimensions (two degrees of freedom). For purposes of the present disclosure, it should be understood that a horticultural container with individual cells has zero degrees of freedom, whereas a container with linear furrows each intended for a row of germinants provides a seeding pattern having one degree of freedom, and a container with one or more two-dimensional (2D) growing beds (e.g., a rectangular seedbed) provides for a seeding pattern having two degrees of freedom.

In various examples discussed in detail below, a horticultural raft according to the present disclosure employs at least a two-tier (or two layer) cavity structure in a raft body of the raft, including a first tier of one or more cavities to contain a porous horticultural growing medium and provide a seeding pattern having one or two degrees of freedom, and a second tier of cavities, coupled to the first tier of cavities, to also contain the porous horticultural growing medium. In some implementations, each first tier cavity is coupled to multiple second tier cavities disposed below the first tier cavity (e.g., the first tier cavity serves as a "top cavity" to contain the growing medium, and the multiple second tier cavities serve as "mid cavities" to also contain the growing medium). In various aspects, the mid cavities may be arranged as individual respective compartments that add to a depth of the top cavity to contain the growing medium, but occupy a smaller effective area in the raft body than would a continuous single mid cavity having the same depth. As a result, the mid cavities provide for a porous growing medium having a significant effective thickness in the raft (due to the combined depths of the top cavity and mid cavities coupled to the top cavity), while at the same time effectively reducing an amount of growing medium that would otherwise be required to fill a continuous single cavity having the same combined depth. In other aspects, the respective depths of the top cavity and mid cavities facilitate sufficient capillary action to allow nutrient solution to reach germinants placed in the growing medium contained in the top cavity, while also effectively mitigating hyperhydration and/or asphyxiation of the germinants by virtue of the combined depth of top and mid cavities being sufficiently tall.

Figure 1C:
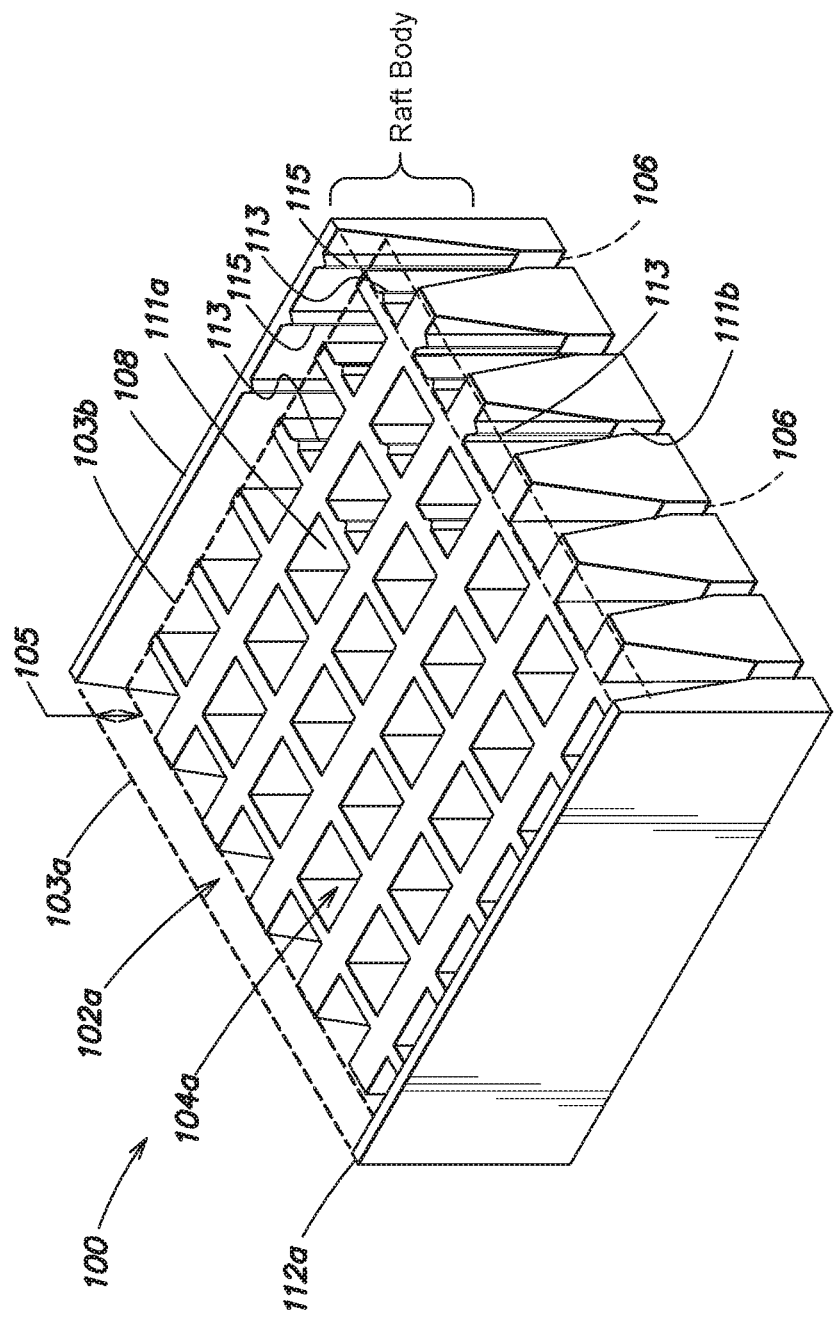

FIGS. 1A-1C show schematics of an apparatus in the form of a horticultural raft 100 for cultivating densely seeded crops according to one inventive implementation. FIG. 1A shows a perspective view of the apparatus 100. FIG. 1B illustrates an interior perspective of a portion of the apparatus 100 showing the growing medium 120 filling the cavities of the apparatus 100. FIG. 1C shows an exterior perspective of the portion of the apparatus 100 without the growing medium 120.

In some examples, the apparatus 100 can be configured as a floating raft used in a cultivation system with water conveyance (see more details below with reference to FIG. 7). In these instances, the apparatus 100 is configured to float in a fluid, such as a nutrient solution. Various means can be employed to float the apparatus 100. In one example, a raft body 110 of the apparatus 100 can include a closed-celled buoyant foam to provide the buoyant force for the apparatus 100. In another example, the raft body 110 can be made of hollow-shell plates with one or more air pockets integrated into the raft body 110 to provide the buoyant force. In yet another example, the raft body 110 can include a concave shell that can trap air in one or more pockets between the liquid surface and the apparatus 100.

As shown in FIGS. 1A and 1C, the raft body 110 of the apparatus 100 has a top-facing non-seedbearing perimeter edge 108 (also referred to as a raft edge 108) that defines a top face of the raft. For example, the top face can be the geometric plane defined by the top surface of the raft edge 108. The apparatus 100 also includes three top cavities 102a, 102b, and 102c (collectively referred to as top cavities 102) at the top face of the raft. The three top cavities 102 are separated by two spacers 112a and 112b. FIG. 1C shows a portion of the apparatus 100, wherein a portion of one of the top cavities 102a therein is the space defined by the dashed lines, one raft edge 108, and one of the spacers 112a.

Each top cavity 102 has a top cavity upper face 103a that in turn includes at least a portion of the top face of the apparatus 100 defined by the top-facing non-seedbearing perimeter edge 108. The first top cavity upper face defines a first projected area. Each top cavity 102 also has a top cavity lower face 103b defining a second projected area. FIG. 1C shows respective portions of the top cavity upper face 103a and the top cavity lower face 103b for the illustrated portion of the top cavity 102a. The distance from the top-facing non-seedbearing perimeter edge 108 to the first top cavity lower face is defined as a first depth 105 (also referred to as the top cavity depth). In some examples, the first depth 105 can be about 0.25" to about 1" (e.g., about 0.25", about 0.3", about 0.35", about 0.4", about 0.45", about 0.5", about 0.55", about 0.6", about 0.65", about 0.7", about 0.8", about 0.9", or about 1", including any values and sub ranges in between).

During cultivation, at least one porous horticultural growing medium 120 is filled into the top cavities 102 as illustrated in FIG. 1B. The top cavity upper face can provide a seeding pattern in the growing medium 120 and the seeding pattern can have one degree of freedom or two degrees of freedom along the portion of the top face of the apparatus 100. For example, the one degree of freedom can be along a first direction 101a or a second direction 101b, while the two degrees of freedom can be along both the first direction 101a and the second direction 101b. While the apparatus 100 of FIGS. 1A, 1B and 1C provide for seeding patterns in two dimensions, similar apparatus 200 shown in FIGS. 2A and 2B (discussed further below) provide for seeding patterns along one dimension (e.g., in furrows).

The apparatus 100 also includes multiple mid cavities 104 coupled to each top cavity 102 so as to also contain the growing medium 120 and having a mid cavity depth 107. It should be appreciated that various mid cavity depths 107 are possible, such as depths of about 0.5" to about 6" (e.g., about 0.5", about 1", about 2", about 3", about 5", or about 6", including any values and sub ranges in between). Considerations for selecting this depth include providing a safe seeding zone for germinants in the upper part of the top cavity, providing an adequate submerged portion of the mid cavity so it can sufficiently contact and conduct water upwards, simultaneously minimizing the excessive submersion of mid cavities under the water level during subirrigation, and minimizing total use of the medium. Each mid cavity 104 has a mid cavity upper face 111a defining a third projected area (see FIG. 1C) that is entirely contained within the second projected area of the top cavity lower face of the top cavity 102. In addition, the group of mid cavities 104 are sized and arranged with respect to the top cavity 102 to: 1) contribute to buoyancy of the floating horticultural raft; 2) allow germinants in the at least one porous horticultural growing medium, when present in the raft, to communicate via capillary action with a nutrient solution when the raft is floating in the nutrient solution; and/or 3) significantly mitigate hyperhydration and asphyxiation at respective root-stem junctions of the germinants.

The apparatus 100 also includes a group of optional bottom cavities 106 located below the mid cavities 104 (see FIGS. 1B and 1C). In operation, the top cavities 102 and the mid cavities 104 are filled with the growing medium 120. As illustrated in FIG. 1B, the growing medium 120 in the top cavity 102 forms a continuous medium block 122, while the growing medium 120 in the mid cavities 104 forms an array of individual medium blocks 124. In operation of the apparatus 100, the bottom cavities 106 are usually filled with water or air 150 (instead of the growing medium 120).

Raft Body and Top Cavities

The raft body 110 can be made of a rigid and reusable material. Optionally, as noted above, the material of the raft body 110 can also be buoyant so as to provide or increase the buoyant force for the apparatus 100 (e.g., when the apparatus 100 is used in a bottom irrigation system).

The top cavities 102 penetrate the top face of the raft body 110 and are filled with the growing medium 120 such that the growing medium 120 is exposed for seeding (see, e.g., FIG. 1B). The upper face of each top cavity 120 can have various shapes, including a rectangle, a square, a honeycomb shape (i.e., hexagon), a trapezoid, or any other appropriate shape. Three top cavities 102a, 102b, and 102c are illustrated in FIG. 1A. However, it should be appreciated that the raft 100 may include a single top cavity or different numbers of multiple top cavities.

In one example, the seeding pattern in top cavities 102 can be arranged into a 1D array. In general, the 1D array can be topologically linear and homeomorphic to a line (e.g. a curve or polyline). Topologically linear cavities (also referred to as furrows) allow for flexibility in seeding pattern along a single axis (i.e. one degree of freedom).

In another example, the seeding pattern in top cavities 120 can be arranged into a 2D array. In general, the 2D array can be topologically rectangular and homeomorphic to a rectangle (e.g. an ellipse or polygon). Topologically rectangular cavities (also referred to as beds) allow for flexibility in seeding pattern along two axes (i.e., two degrees of freedom). In either 1D array or 2D array of the seeding pattern in top cavities 102, the flexibility in the seeding density can be achieved by varying the number of seeds or plant propagules ("germinants") placed into each top cavity 120. In some examples, the top cavities 102 may be arranged into a 1D or 2D array, but in either case, the seeding pattern can also be arranged into a 1D or 2D array independent of the arrangement of the top cavities 102.

As described herein, the lower face of each top cavity 102 defines the second projected area that is entirely contained within or equal to the first projected area of the upper face of the top cavity 102. In one example, the first projected area and the second projected area are substantially equal. In this case, the side walls of the top cavities 102 are perpendicular to the upper face of the top cavities 102 and the top cavities 120 can have a cuboid shape (also referred to as a rectangular prism).

In another example, the second projected area of the lower face of a given top cavity is less than the first projected area, in which case the side walls of the top cavities can have an effective oblique angle with respect to the upper face of the top cavities 102. The effective oblique angle can be, for example, about 60° to about 90° (e.g., about 60°, about 70°, about 80°, about 85°, or about 90°, including any values and sub ranges in between). The ratio of the second projected area to the first projected area can be, for example, about 10% to about 90% (e.g., about 10%, about 20%, about 30%, about 40%, about 50%, about 60%, about 70%, about 80%, or about 90%, including any values and sub ranges in between). The shape of the top cavities 102 can include, for example, a downwards tapered trapezoidal prism and/or an inverse pyramid.

Mid Cavities

In one implementation, at least one of the top cavities 102a, 102b, and 102c is connected to a corresponding group of mid cavities 104a, 104b, and 102c. Thus, one top cavity is connected to multiple mid cavities. In one example, the group of mid cavities 104 coupled to a given top cavity is arranged into a 1D array. In another example, the group of mid cavities coupled to a given top cavity is arranged with respect to the top cavity in a two-dimensional pattern (e.g., a 2D array or grid of cavities, a 2D lattice, etc.). In either case, while the growing medium 120 fills the top cavity continuously, the growing medium 120 is broken up into individual compartments within the layer of mid cavities 104. In other examples, a linear pattern of mid cavities 104 (e.g., 1D array) can be used when the top cavity 102 is formed as a furrow, and a two-dimensional pattern of mid cavities 104 can be used when the top cavity 102 is formed as a bed.

As described herein, the upper face 111a of each mid cavity 104 defines the third projected area, which is entirely contained within or substantially equal to the second projected area of the lower face of its corresponding top cavity 102 (see FIG. 1C). Additionally, the lower face 111b of each mid cavity 104 defines the fourth projected area that is entirely contained within the third projected area of the upper face of the mid cavity 104 (see FIG. 1C). The ratio of the fourth projected area to the third projected area can be, for example, about 10% to about 90% (e.g., about 10%, about 20%, about 30%, about 40%, about 50%, about 60%, about 70%, about 80%, or about 90%, including any values and sub ranges in between). Thus, respective mid cavities may have various shapes including, but not limited to, a rectangular prism, a cylinder, a downwards tapered trapezoidal prism, an inverse pyramid, or a downwards tapered truncated elliptic cone.

The spacing between neighboring mid cavities 104 can be, for example, about 0.5" to about 3" (e.g., about 0.5", about 0.6", about 0.7", about 0.8", about 0.9", about 1.0", about 1.5", about 2", about 2.5", or about 3", including any values and sub ranges in between). The spacing can depend on the type of crops. In some examples, the top width of the mid cavities 104 can be about 0.25" to about 2.5" (e.g., about 0.25", about 0.5", about 1", about 1.5", about 2", or about 2.5", including any values and sub ranges in between). The bottom width of the mid cavities 104 can be about 0.1" to about 0.5" (e.g., about 0.1", about 0.15", about 0.2", about 0.25", about 0.3", about 0.35", about 0.4", about 0.45", or about 0.5", including any values and sub ranges in between).

Growing Medium

The growing medium 120 is separable from the apparatus 100 and can be alternately filled into and removed from the apparatus 100. For example, during the growth of plants, new growing medium may be added into the top cavity 102 and/or the mid cavities 104 to ensure a sufficient amount of growing medium for the plants. In addition, after the harvesting of the plants, the growing medium 120 may be removed from the apparatus 100 to clean plant roots and/or any other debris that might affect the cultivation of new plants, and to create space for new medium in new growing cycles.

In operation, the growing medium 120 can perform several functions. For example, the growing medium 120 can function as a receptacle for seeds or other plant propagules (collectively "germinants"). The porosity of the growing medium 120 allows plant roots to grow downwards and absorb water or nutrients from the nutrient solution beneath the apparatus 100 via, for example, capillary action. The growing medium 120 can also provide mechanical support for the seeds or other plant propagules. In some examples, the growing medium 120 can be biologically inert.

In some examples, the apparatus 100 can be used in a top irrigation system, where water or nutrient solution is delivered into the apparatus 100 from above. In this case, the porosity of the growing medium 120 also allows the water or nutrient solution to flow downward to reach the plant roots. In some examples, top irrigation and sub-irrigation can be used at the same time or alternating times to facilitate plant growth.

In one example, the growing medium 120 includes a granular medium such as peat moss or coconut coir, that is pourable so as to facilitate easy filling and removal. The growing medium may also include one of more of membrane, a foam (e.g., an open-celled foam), a gel, and a textile.

In yet another example, the growing medium 120 can include any combination of any of the example materials described above. For example, the growing medium 120 can include a mixture of a granular medium together with a membrane. In another example, the growing medium 120 can include a mixture of a granular medium together with one or more of a gel, a foam, and a textile. In one implementation, the gel, foam, or textile can be placed at the bottom of the mid cavities 104 and the granular medium can be placed on top of the gel, foam, or textile so as to reduce or eliminate the fall-through the granular medium into the water or nutrient solution below the apparatus 100.

In some examples, the raft body 110, the growing medium 120, and cavities 102 and 104 are integrated such that the growing medium 120 completely fills each top cavity 102 and mid cavity 104 within the apparatus 100, thereby allowing the growing medium 120 to efficiently communicate with the water body or nutrient solution below. Germinants are placed within the growing medium in each top cavity 102, allowing the root system to develop downwards through the growing medium 120 and into the water below.

The growing medium 120 can be held within the mid cavities 104 (and/or the top cavities 102) via various techniques. In one example, the growing medium 120 can be held within the mid cavities 104 by the friction force between the growing medium 120 and the inner walls of the mid cavities 104. In this instance, the inner walls of the mid cavities can be roughened to increase the friction force. In another example, a cohesive binding agent can be used to hold the growing medium 120 within the mid cavities 104.

Generally, a furrow or bed provided by a horticultural container or raft according to the present disclosure, and filled with a porous horticultural growing medium to provide a seedbed for germinants, allows germinants to communicate with a nutrient solution in a manner that avoids hyperhydration (i.e. excess moisture) and asphyxiation (i.e. deficit of oxygen) at respective root-stem junctions of the germinants. At the same time, the seedbed can also provide structural support to the root system and a means of floatation that is robust against changes in the weight of the plants. A nutrient solution can be brought in contact with germinants in the growing medium via capillary action. Upon germinating, the germinants extend their roots downwards through the porous medium, which provides both structural support and access to nutrients. In some implementations, the porous medium can itself be buoyant.

In various aspects, hyperhydration and oxygenation issues can be controlled by using an effectively thick layer of porous material. In some conventional floating seedbed systems, there may be relatively high moisture near the bottom of the porous growing medium, resulting in possible hyperhydration as well as possible asphyxiation of plant tissues if respective stem-root junctions of the germinants are too close to this water-saturated area in the porous material. Accordingly, in various implementations disclosed herein, germinants can be placed sufficiently above the bottom of the porous growing medium to provide them with adequate aeration. The capillary distance to this safe seeding zone in different types of porous growing medium can be significant. Accordingly, various configurations of cavities having particular depths implemented in a horticultural container according to the present disclosure (to accommodate particular thicknesses of growing medium) address one or more of the material use, buoyancy, hydraulic conductance of nutrient solution (e.g., via capillary action), hyperhydration and asphyxiation issues or features noted above.

In some examples, a significant thickness of the growing medium 120 can be maintained above the water underneath the apparatus 100. For example, the thickness above the water can be substantially equal to or greater than 1" (e.g., about 1", about 1.1", about 1.2", about 1.3", about 1.4", about 1.5", about 1.6", or greater, including any values and sub ranges in between). In some examples, the thickness above the water can be substantially equal to the sum of the top cavity depth 105 and a portion of the mid cavity depth 107. In other examples, the thickness above the water can be substantially equal to the sum of the top cavity depth 105 and the mid cavity depth 107. In these instances, the lower face of the mid cavities 104 can be in contact with or in close proximity to the water level.

Thus, the horticultural containers according to the present disclosure provide multiple advantages over conventional horticultural rafts. First, the apparatus 100 provides for seeding patterns having one or two degrees of freedom (via linear furrows or rectangular beds, described further below). The containers can also have furrows structurally strong enough to be implemented at any length, width, orientation, and spacing. The sum of the top cavity depth 105 and the mid cavity depth 107 can be configured to provide a total depth to address the hyperhydration or asphyxiation issues. In addition, since the mid cavities 104 are divided into multiple individual cavities, the total amount of growing medium 120 can be significantly lower compared to that used in conventional rafts. In some examples, the mid cavities 104 can substantially reduce the quantity of the growing medium 120 by at least 40% (about 40%, about 45%, about 50%, about 55%, about 60%, about 65%, about 70%, or greater, including any values and sub ranges in between) as compared to the continuously-filled single-cavity furrow or single-cavity bed.

Growing Medium Barriers

In yet another example, the apparatus 100 can further include a barrier disposed underneath the growing medium 120 to hold the growing medium 120. The barrier can include, for example, a mesh, a screen, or a filter, which allows for the pass-through of plant roots but prevents downward fall-through the growing medium 120. In one example, the barrier can be permanently integrated into the apparatus 100 (e.g., at the bottom of the mid cavities 104 or the bottom cavities 106). In another example, the barrier can be removable from the apparatus 100, in which case a user may change different barriers depending on the type of growing medium 120 used in operation. Any of the techniques described herein can be used either individually or in combination.

Optional Bottom Cavities

Each mid cavity 104 can be connected to a bottom cavity 106. In one example, each bottom cavity 106 is filled with air. In another example, each bottom cavity is filled with water (or nutrient solution underneath the apparatus 100). The filling material of the bottom cavity 106 can depend on, for example, the location of the water in the growing system relative to each bottom cavity 106. For example, in a flood and drain irrigation scheme, bottom cavities 106 can alternately be filled with water or air during flooded and drained periods, respectively. In another example, in a top-watering irrigation scheme, bottom cavities 106 can be always filled with air.

The bottom face of each bottom cavity 106 defines a projected area (referred to as the sixth projected area) that either contains or is contained within the projected area (referred to as the fifth projected area) of the top face of the said bottom cavity 106. The shapes of the bottom cavities 106 can include, for example, a rectangular prism, a cylinder, a downwards or upwards tapered trapezoidal prism, a downwards or upwards tapered truncated elliptic cone, a pyramid or an inverse pyramid. In one example, each bottom cavity 106 can be deep and configured into the form of a vertical channel. In another example, each bottom cavity 106 can be shallow and configured into the form of a collar or a lip.

Air Gaps and Irrigation Methods

In some implementations, horticultural containers according to the present disclosure may be configured such that one or more air gaps are present between a surface of a nutrient solution in which a container is floating and the bottom of the porous growing medium present in the container. In one aspect, such an air gap/air gaps address hyperhydration and oxygenation issues. One or more air gaps can be an integral component of the rafts themselves; alternatively, one or more air gaps can be achieved operationally, such as in a flood and drain system. In other aspects, one or more air gaps can act as a buffer between the nutrient water and the biologically inert growing medium, allowing for at least the following benefits: (i) root exudates are shed downwards, preventing harm to root tissue and enabling the recruitment of root symbioses; (ii) salt accumulation in the growing medium can be lessened, instead of building up via evaporation amplified by capillary action; (iii) increased oxygenation and gas exchange are facilitated in the unsubmerged root zone, due to both the air gap itself and an effectively dry growing medium above the air gap; (iv) increased oxygenation and gas exchange are facilitated in the nutrient solution itself, due to improved contact of the nutrient solution with air; and (v) excess moisture around the stem-root junction can be reduced.

In one example, one or more air gaps are implemented permanently once the root system of a given germinant has protruded substantially from the bottom of the horticultural container and into the nutrient solution, for example by lowering the water level with respect to the raft. This allows nutrient uptake to occur via the roots directly (instead of being intermediated by hydraulic conductance through the growing medium).

In another example, one or more air gaps are implemented intermittently (e.g., repeatedly off and then on), for example via flood and drain. Rafts subjected to air gaps on an intermittent schedule can be capable both of floatation and nutrient uptake via hydraulic conductance upwards through the growing medium during germination and/or growth.

Additional Features and More Examples of Optional Components

In some examples, the bottom of the apparatus 100 can include structures to increase the mechanical strength of the apparatus 100. The structures can include, for example, feet, ridges, or nipples defined underside of the apparatus 100. These structures can also allow germination to occur while the apparatus 100 is disposed in a shelfless vertically stacked configuration. In addition, these structures also create space between the bottom of the apparatus 100 and any supporting surface, thereby allowing plant roots to hang during conveyance.

Figure 1D:
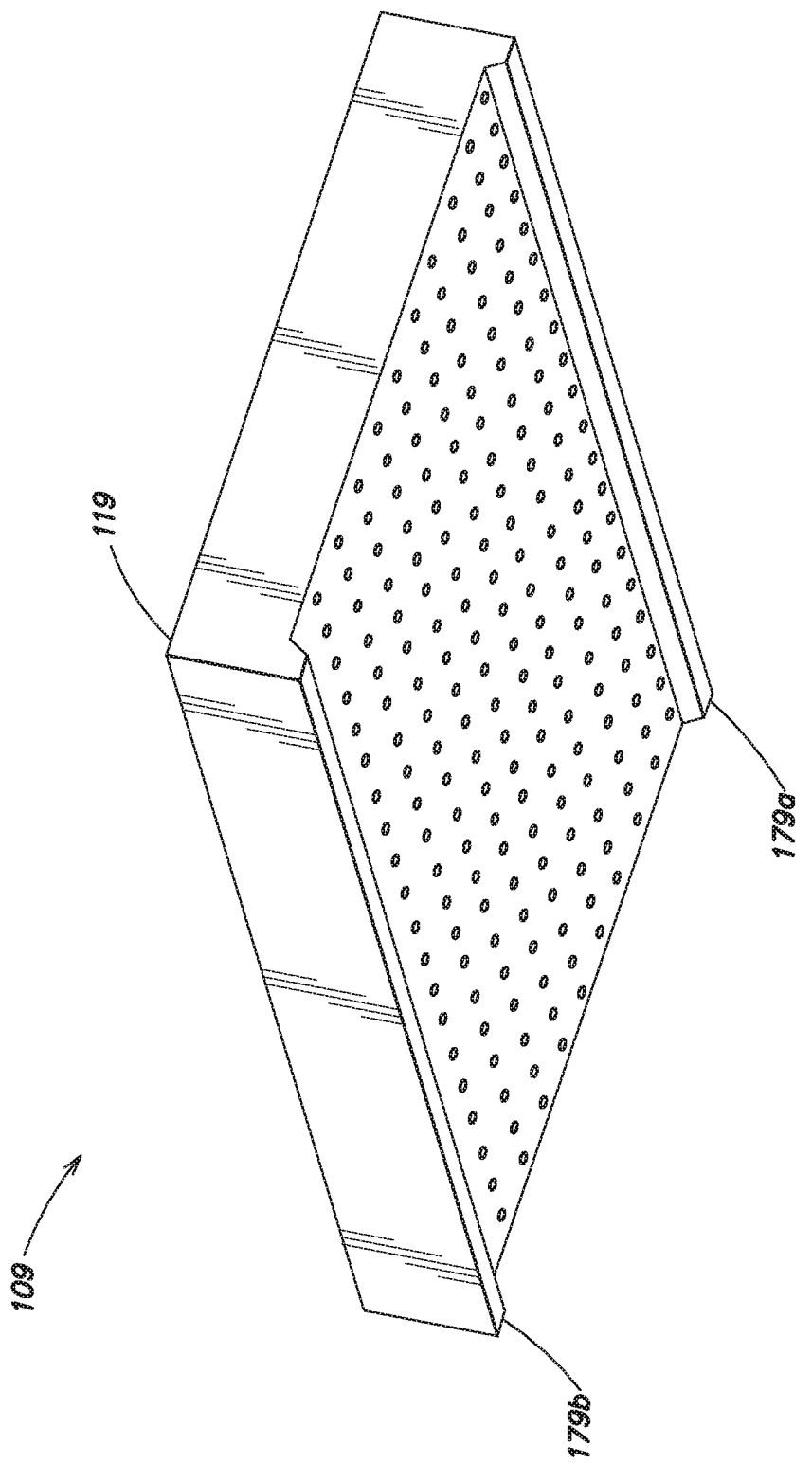
FIGS. 1D and 1E show schematics of an apparatus including two feet at the bottom for cultivating densely seeded crops.
Figure 1E:
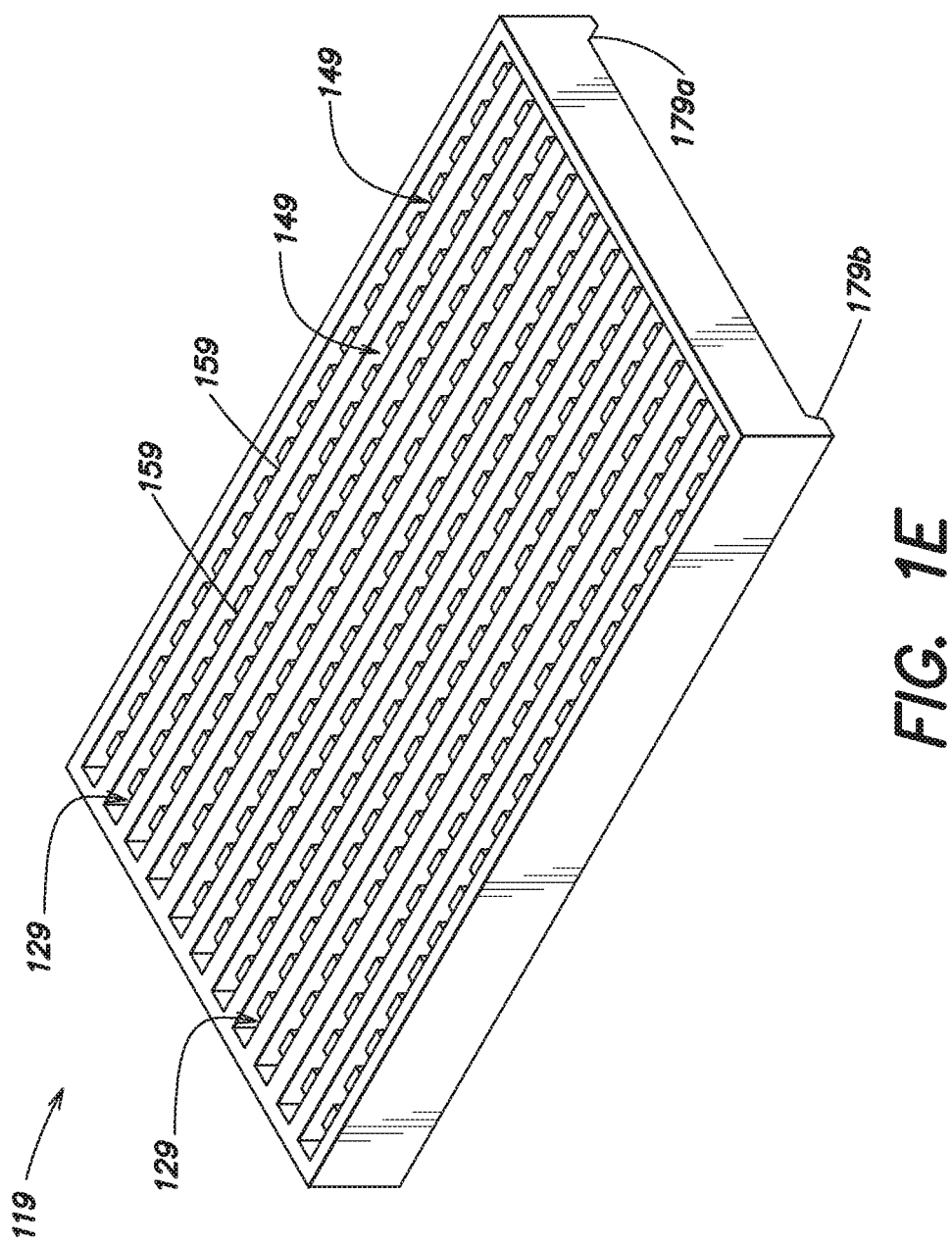

FIGS. 1D and 1E show schematics of an apparatus 109 including two feet at the bottom for cultivating, densely seeded crops. The apparatus 109 includes a raft body 119 supporting two tiers of cavities: an array of top cavities 129 separated by an array of spacers 159 and mid cavities 149 disposed below the top cavities 129. The apparatus 109 also includes two feet 179a and 179b (collectively referred to as feet 179) to allow germination and create space for roots to hang as described above. In one example, the feet 179 can be integrated with the raft body 119. For example, the raft body 119 and the feet 179 can be sections of a single piece. In another example, the feet 179 can be removable from the raft body 119.

In some examples, multiple rafts like the apparatus 100 can be used for cultivating crops. For example, in a growing system with floating conveyance, multiple rafts are used in series along a vessel or pond containing nutrient solution for crop growth and rafts conveyance. In these examples, a mechanism for reversibly interlocking or connecting these rafts can be introduced. The mechanism can include, for example, physical ties, magnetic ties, rods, stakes, and/or interlocking components (such as tabs and grooves) integral to the raft body 110.

In some examples, the apparatus 100 can further include a regular pattern of grooves or holes incorporated to the bottom or side surfaces of the apparatus 100. For example, the pattern can be disposed or defined on the side planes of the raft body 110, on the bottom plane (e.g., on the bottom surface of the mid cavities 104 and/or the bottom of the bottom cavities 106 if used), and/or on the bottom of any optional ridges or feet. These grooves or holes can facilitate handling of the apparatus 100 by enabling non-floating conveyance systems (e.g., a mechanical drivetrain) to obtain traction on the raft, e.g. for conveyance out of the ponds.

In some examples, the apparatus 100 can further include vertical ridges that protrude inwards along the interior of cavities (e.g., top cavities 102 and/or mid cavities 104). These ridges can be employed to encourage plant roots to extend downwards rather than sideways and are also referred to as root training ridges.

In some examples, the apparatus 100 can further include vertical grooves that protrude outwards along the interior of cavities (e.g., top cavities 102 and/or mid cavities 104). These grooves can be employed to facilitate the growing medium 120 with plants to be lifted out of the apparatus 100 cleanly in a mechanized fashion without damaging the plants.

In some examples, the apparatus 100 can further include air vents for air exchange. For example, the air vents can be incorporated into the raft body 110 and can connect the lower surface of the apparatus 100 to the upper surface of the apparatus 100 (e.g., where the plant canopy and growing medium are held). The exchange of air between these two surfaces can facilitate oxygenation in the growing medium and plant canopy.

In some examples, the apparatus 100 can further include elements or components for controlling sink depth and/or implementing an air gap underneath the apparatus 100. For example, it can be helpful to dynamically adjust the water level of the water pond where the apparatus 100 is placed and/or conveyed. When the water level is high, the apparatus 100 can be configured to float freely. When the water is at an intermediate level, the undersides of the apparatus 100 may be still submerged but can be made to rest either on the bottom of the ponds or on a system of elevated rails protruding above the bottom of the ponds. This contact between the apparatus 100 and pond bottom or rails can ensure that the sink depth of the apparatus 100 is controlled. When the water is at a low level, the undersides of the apparatus 100 can be exposed to an air gap such that while the roots can still penetrate into the pond, the growing medium 120 is away from the water (i.e., without physical contact with the water).

In some examples, the apparatus 100 can further include an array of buoyant chambers, which can be built into the raft body 110 and extend downwards. In one example, the buoyant chambers can be disposed in between the lower faces of some of the mid cavities 104 (e.g., between openings of the mid cavities 104). In another example, the buoyant chamber can be disposed in between the lower faces of some of the openings of the bottom cavities 106.

In some examples, the apparatus 100 can further include a non-seedbearing space along the perimeter of the raft body 110, such that there is an increased gap between the seed-bearing area of the apparatus 100 and the exterior of the apparatus 100. This space can be utilized both for buoyancy and for achieving separation between the plant canopies and root systems of neighboring rafts. In some cases, the space can be provided by the thickness of the raft edge 108.

In some examples, the apparatus 100 can be adapted to be disposed on a drip try, e.g., as used in a non-floating conveyance system. The drip tray can prevent moisture on the roots from dripping onto equipment or other rafts. In addition, the drip tray can hold a thin layer of liquid at its bottom and therefore prevent the root systems from dehydrating during non-floating conveyance. In one example, the drip tray can have internal rails or angled sides to support the raft body 110 while leaving space underneath for the plant roots. In another example, the drip tray can be configured to allow the apparatus 100 to slide in and out of the drip tray without lifting. For example, the end of the drip try can have a height less than the height of the sides. In yet another example, the drip tray can include indentations, lips, handles, or depressions incorporated into the side walls of the drip tray to facilitate the ease of both manual and robotic handling, such as the removal of apparatus 100 from the trays. In some cases, the drip try can also be manufactured to be nestable during storage. Drip trays can be such that one drip tray can hold multiple rafts.

In some examples, the apparatus 100 can further include a tag 160 including information about the apparatus 100 and/or about the plants grown in the apparatus 100. In one example, the tag 160 can be integrated into the apparatus 100 (e.g., on the wall of the raft body 110 as illustrated in FIG. 1A). In another example, the tag 160 can be removable from the apparatus 100. For example, each time a new round of crops is planted, a new tag 160 can be placed onto the apparatus 100. The tag can include, for example, a barcode, a QR code, or a radio frequency identification (RFID) chip, among others.

In some examples, the apparatus 100 can further include various sensors to sense characteristics of the pond water, air, and/or the growing medium 120, as well as characteristics of the apparatus 100 itself (e.g., the sink depth). The apparatus 100 can further include a communication interface to transmit the data acquired by these sensors to an external device, such as a computer, a smartphone, or a tablet, among others. The communication interface can include a wireless communication interface using WiFi, LTE, 3G, 4G, Bluetooth, or any other wireless technologies. In some cases, the apparatus 100 can further include power supplies for these tags. In other cases, such as an RFID tag, the tag reader can transmit RF energy to the tag while reading data from the tag.

In some examples, the apparatus 100 can further include components for robotic and manual handling of the raft body 110. For example, the apparatus 100 can include contact points for soft robotic manipulators, indentations for manual gripping and handling, and indentations to facilitate automatic nesting and denesting of rafts.

Applications in Irrigation Systems

The apparatus 100 can be used in various irrigation systems. In one example, the apparatus 100 can be used in a non-floating application. Non-floating applications, in general, involve the growth of plants in trays sitting on a mobile or stationary surface. The apparatus 100 can also be used as trays, grown on a surface or platform and irrigated either via pre-irrigation, subirrigation, or top irrigation. In pre-irrigation, the growing medium 120 itself is wetted upon seeding and growing conditions are kept humid throughout the entire growth cycle, therefore obviating additional irrigation for young crop production. In subirrigation, irrigation is provided from below, either permanently or intermittently (e.g. flood and drain). In top irrigation, irrigation is provided from above, e.g. via sprinklers. The apparatus 100 may or may not float in this example. In yet another example, the apparatus 100 can be used in a bottom irrigation system with water conveyance, in which case the apparatus 100 floats in a vessel or pond and is conveyed along the liquid vessel or pond during the growth of crops.

ADDITIONAL EXAMPLES

Figure 2A:
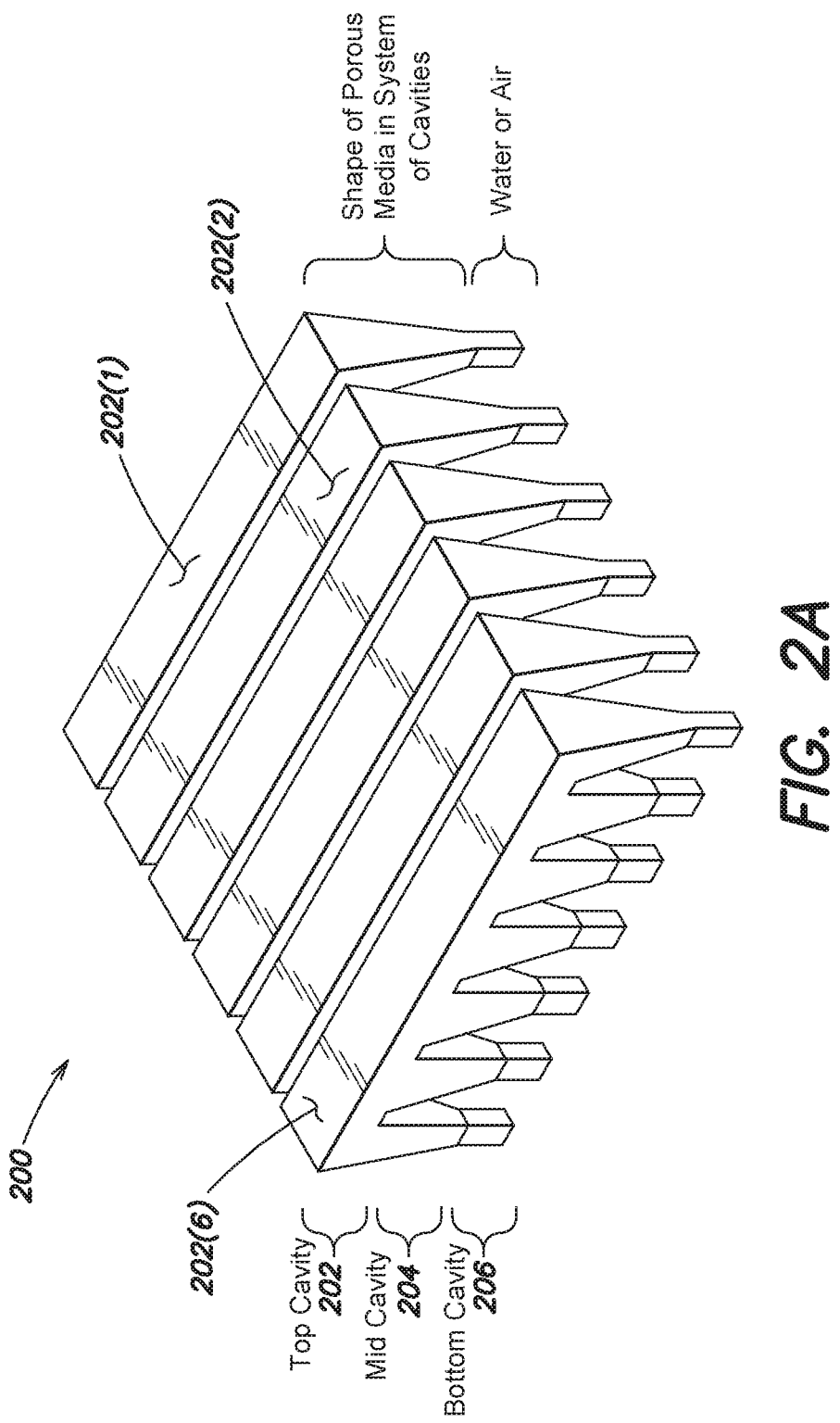
FIGS. 2A and 2B show schematics of an apparatus providing for a seeding pattern having one degree of freedom for cultivating densely seeded crops.
Figure 2B:
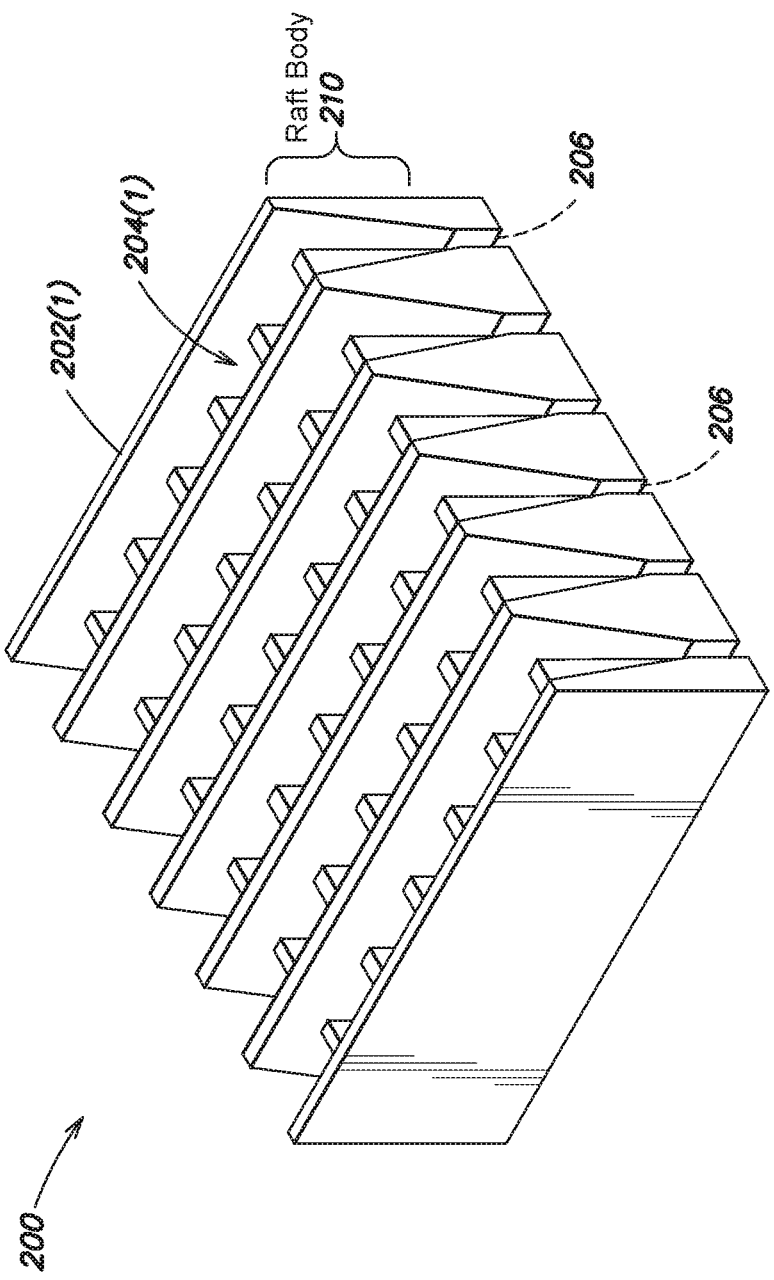

FIGS. 2A and 2B show schematics of an apparatus 200 having one degree of freedom in seeding pattern for cultivating densely seeded crops. The apparatus 200 includes a raft body 210 supporting three tiers of cavities: an array of top cavities 202(1) to 202(6) (collectively referred to as top cavities 202), an array of mid cavities 204 disposed below each top cavity 202, and a bottom cavity 206 disposed below each mid cavity 204. As illustrated in FIGS. 2A and 2B, each top cavity 202 is configured as a furrow (i.e., having a linear topology). Although a straight line furrow is shown in FIG. 2A, other linear topologies can also be used. For example, each top cavity 202 can have a polyline shape including multiple sections of straight line furrows.

Figure 3:
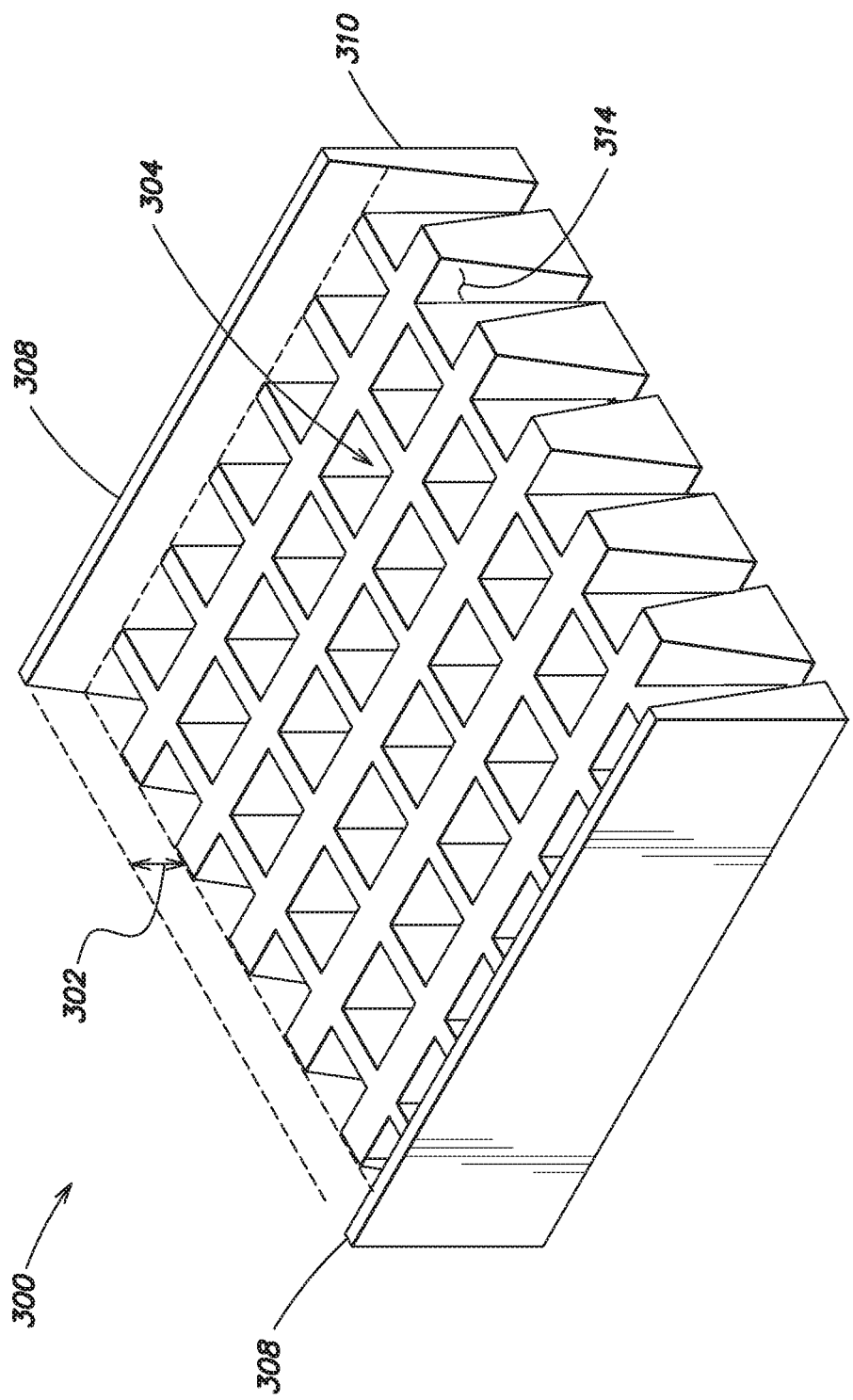
FIG. 3 shows a schematic of an apparatus without bottom cavities for cultivating densely seeded crops.

FIG. 3 shows a schematic of an apparatus 300 similar to the apparatus 100 shown in FIGS. 1A, 1B and 1C without bottom cavities. The apparatus 300 includes a raft body 310 supporting two tiers of cavities: a top cavity 302 (i.e., the space defined by the dashed lines and two raft edges 308) and an array of mid cavities 304. Each mid cavity 304 has a top square face (i.e., the face toward the top cavity 302) and a bottom square face opposite the top square face. The bottom square face is smaller than the top square face such that each mid cavity 304 has an inverse pyramid shape (truncated before the tip of the pyramid). As illustrated in FIG. 3, the inner wall 314 of each mid cavity has an effective oblique angle with respect to the top and/or bottom square surfaces. The effective oblique angle can be, for example, about 30° to about 89° (e.g., about 30°, about 40°, about 50°, about 60°, about 70°, or about 80°, about 85°, or about 89°, including any values and sub ranges in between). In operation, the lower square surfaces of the mid cavities 304 can be in contact with the water or nutrient solution.

Figure 4A:
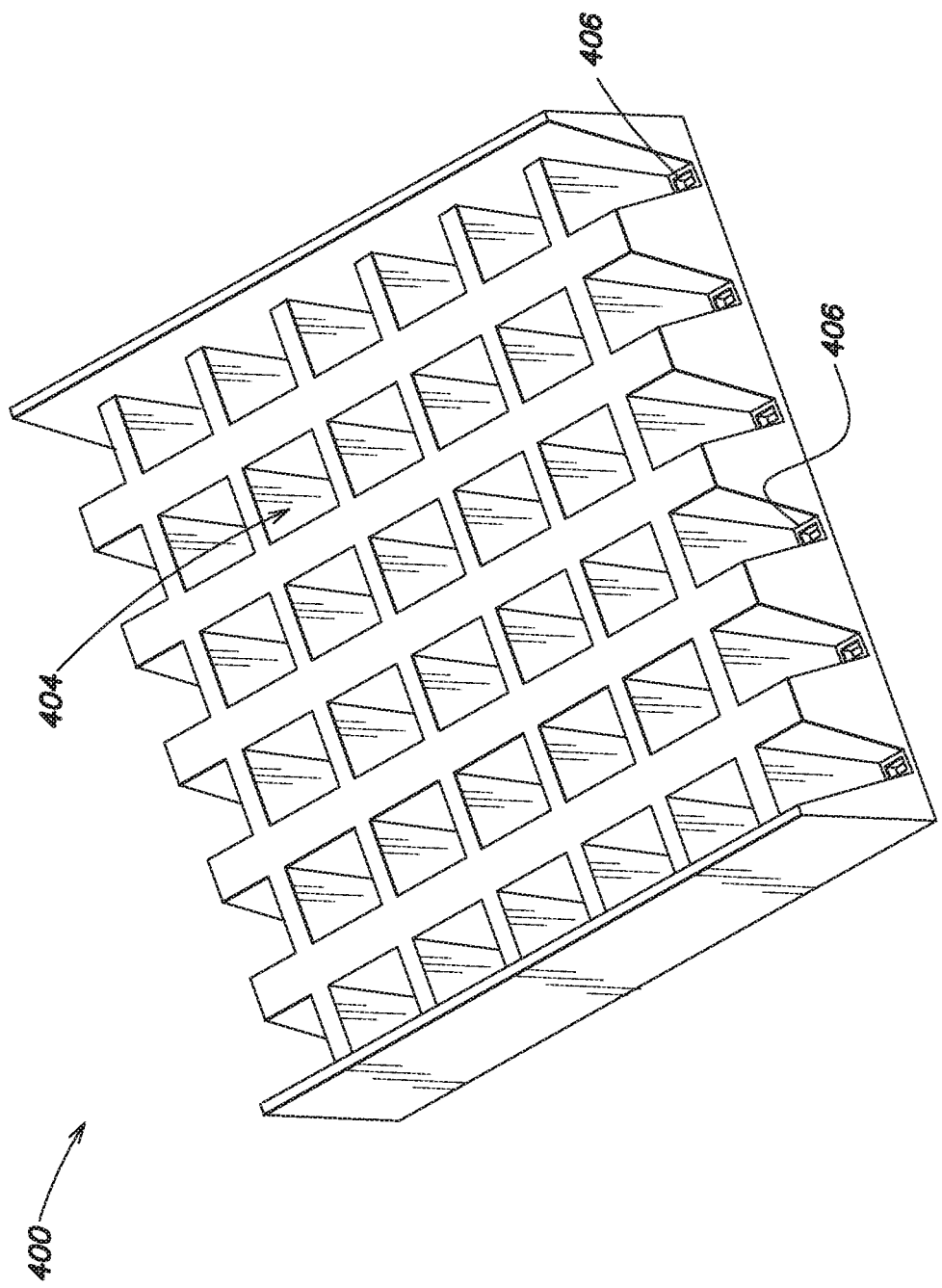
FIGS. 4A and 4B show schematics of an apparatus including bottom cavities for cultivating densely seeded crops.
Figure 4B:
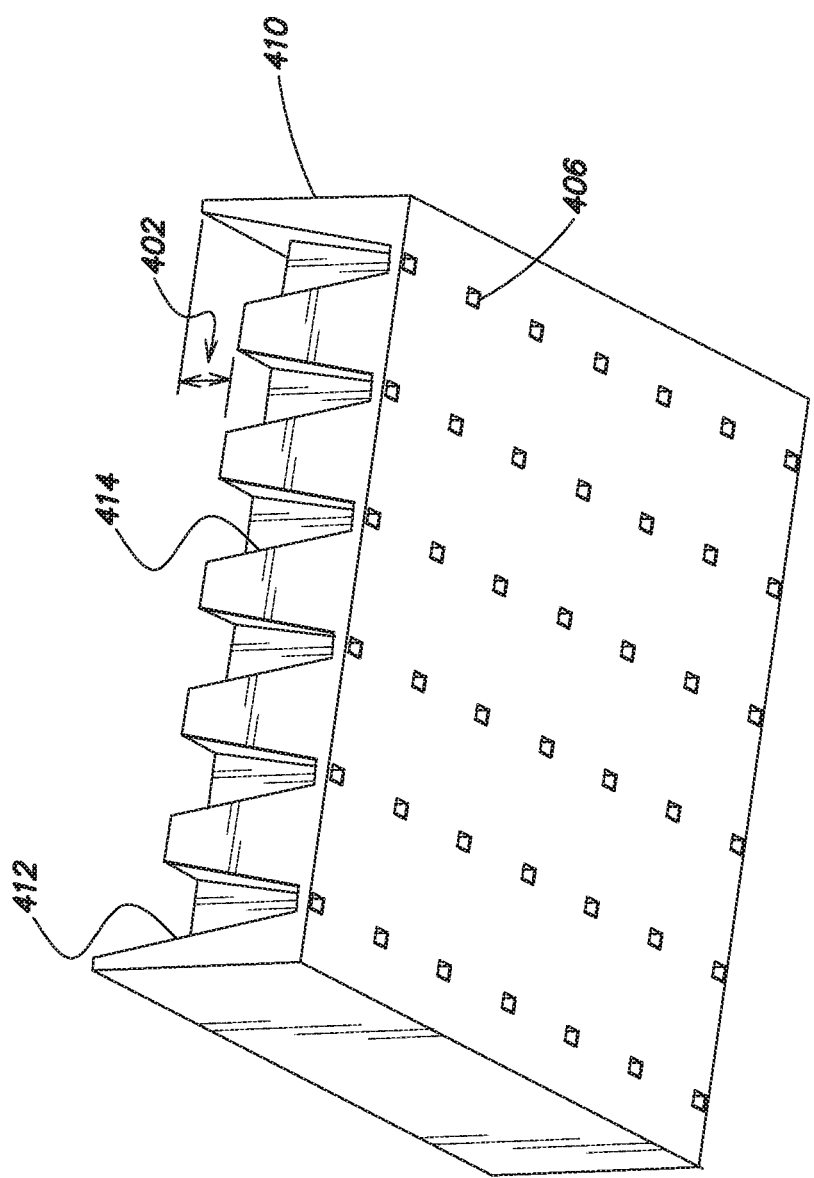

FIGS. 4A and 4B show schematics of an apparatus 400 including bottom cavities for cultivating densely seeded crops. FIG. 4A shows a top view of the apparatus 400 and the FIG. 4B shows a bottom view of the apparatus 400. The apparatus 400 includes a raft body 410 supporting three tiers of cavities: a top cavity 402, an array of mid cavities 404 disposed below the top cavity 402, and an array of bottom cavities 406, each of which is disposed below a corresponding mid cavity 404. The bottom cavities 406 are configured in the form of collars or lips to reduce the fall-through (and loss) of growing medium (not shown in FIGS. 4A and 4B) disposed in the top cavity 402 and the mid cavities 404.

The inner wall 414 of the mid cavities 404 has an effective oblique angle with respect to the top and/or bottom surface of the mid cavities 404. As a result, the cross sectional area of each mid cavity 404 decreases along the depth towards the bottom of the mid cavities 404. The inner wall 414 of the mid cavities 404 is an extension of the inner wall 412 of the top cavity 402. In other words, the cross sectional area of the top cavity 402 also decreases along the depth toward the bottom of the top cavity 402, i.e. the top cavity 402 has a truncated inverse pyramid shape.

Figure 5A:
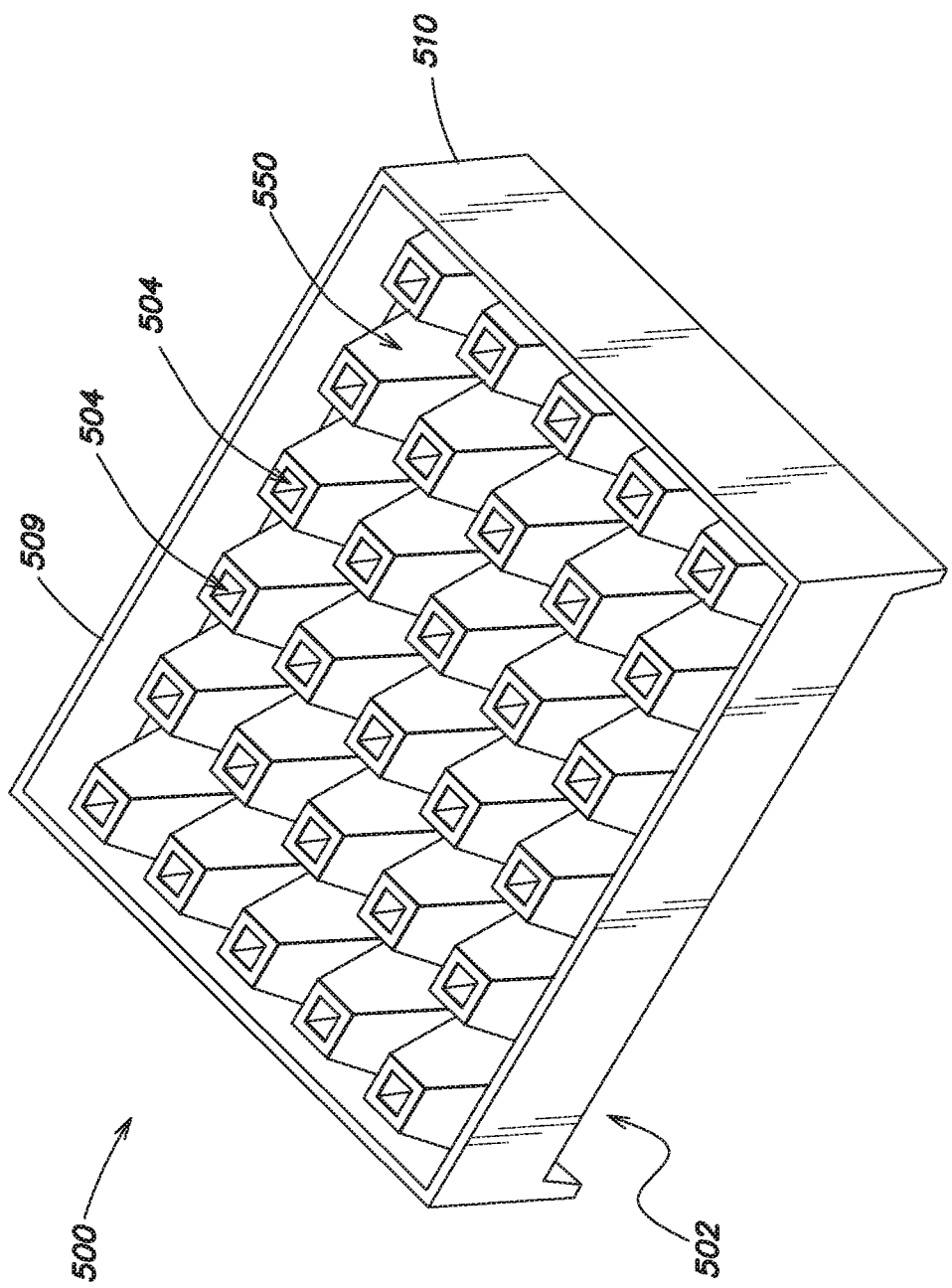
FIGS. 5A and 5B show bottom views of an apparatus that traps air between the underside of the apparatus and a fluid medium to provide buoyancy.
Figure 5B:
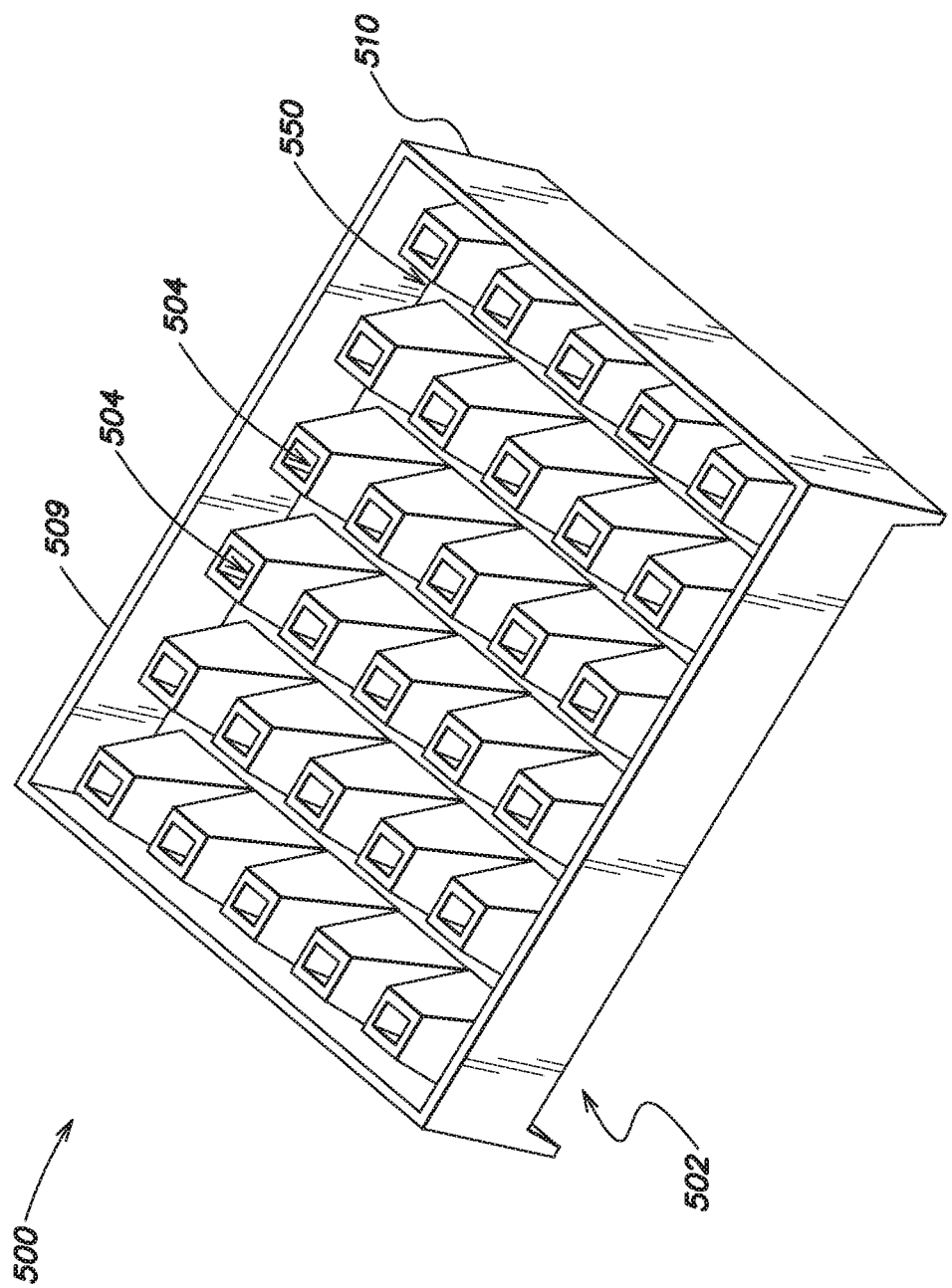

FIGS. 5A and 5B show bottom views of an apparatus 500 that traps air between the underside of the apparatus 500 and the water to provide buoyance force. The apparatus 500 includes a raft body 510 supporting two tiers of cavities: a top cavity 502 and an array of mid cavities 504. In operation, the apparatus 500 can be placed into a vessel containing water or nutrient solution. The underside of the apparatus 500 and the water level defines a space 550 that can be used to trap air so as to provide buoyance force to float the apparatus 500. The space 550 can include, for example, the space between adjacent mid cavities 504, the space between the tips of the mid cavities 504 and the plane defined by the four edges 509 of the raft body, as well as possible space within the mid cavities 504 that is not filled with growing medium.

Figure 6A:
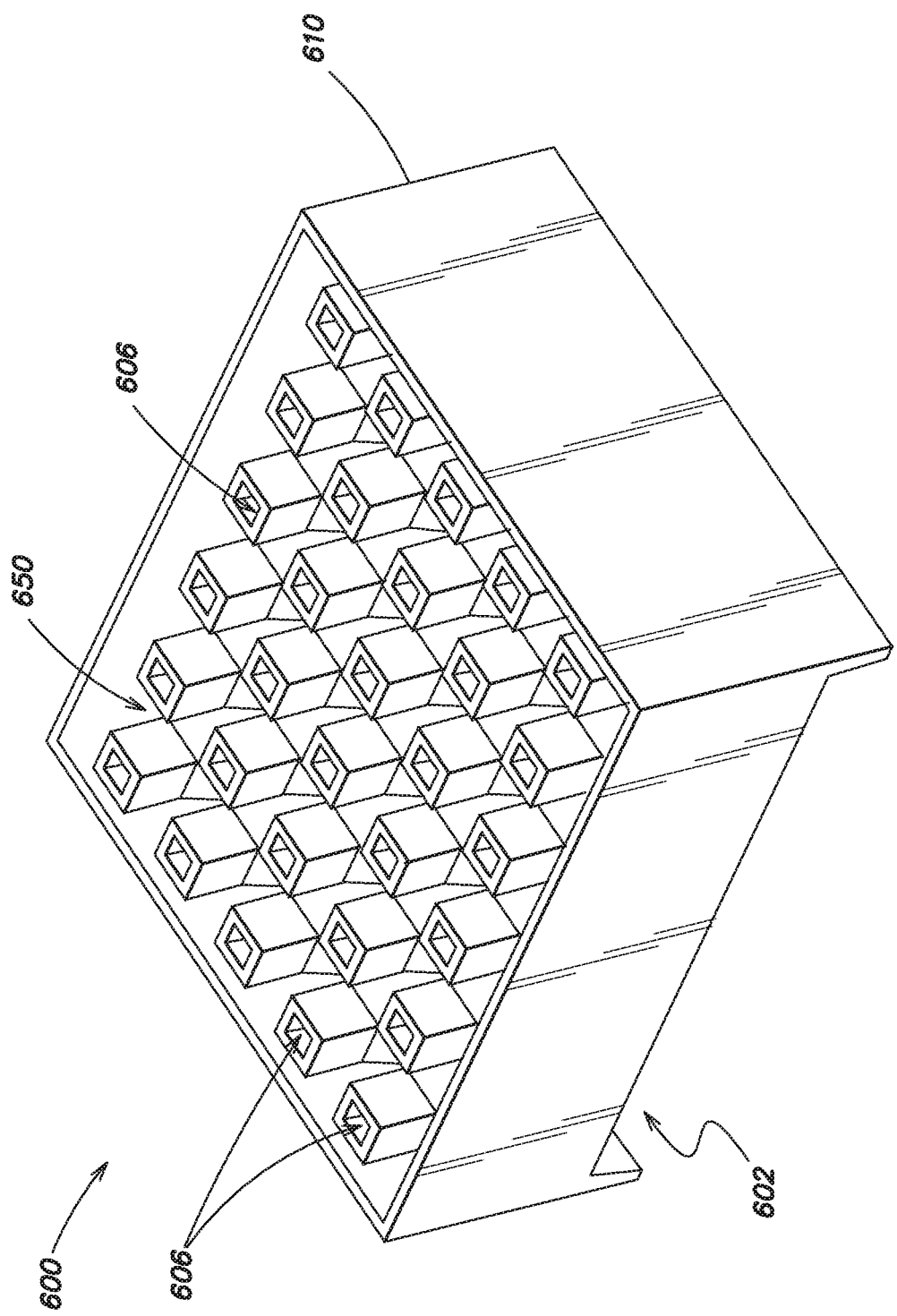
FIGS. 6A and 6B show bottom views of an apparatus including bottom cavities configured as vertical channels.
Figure 6B:
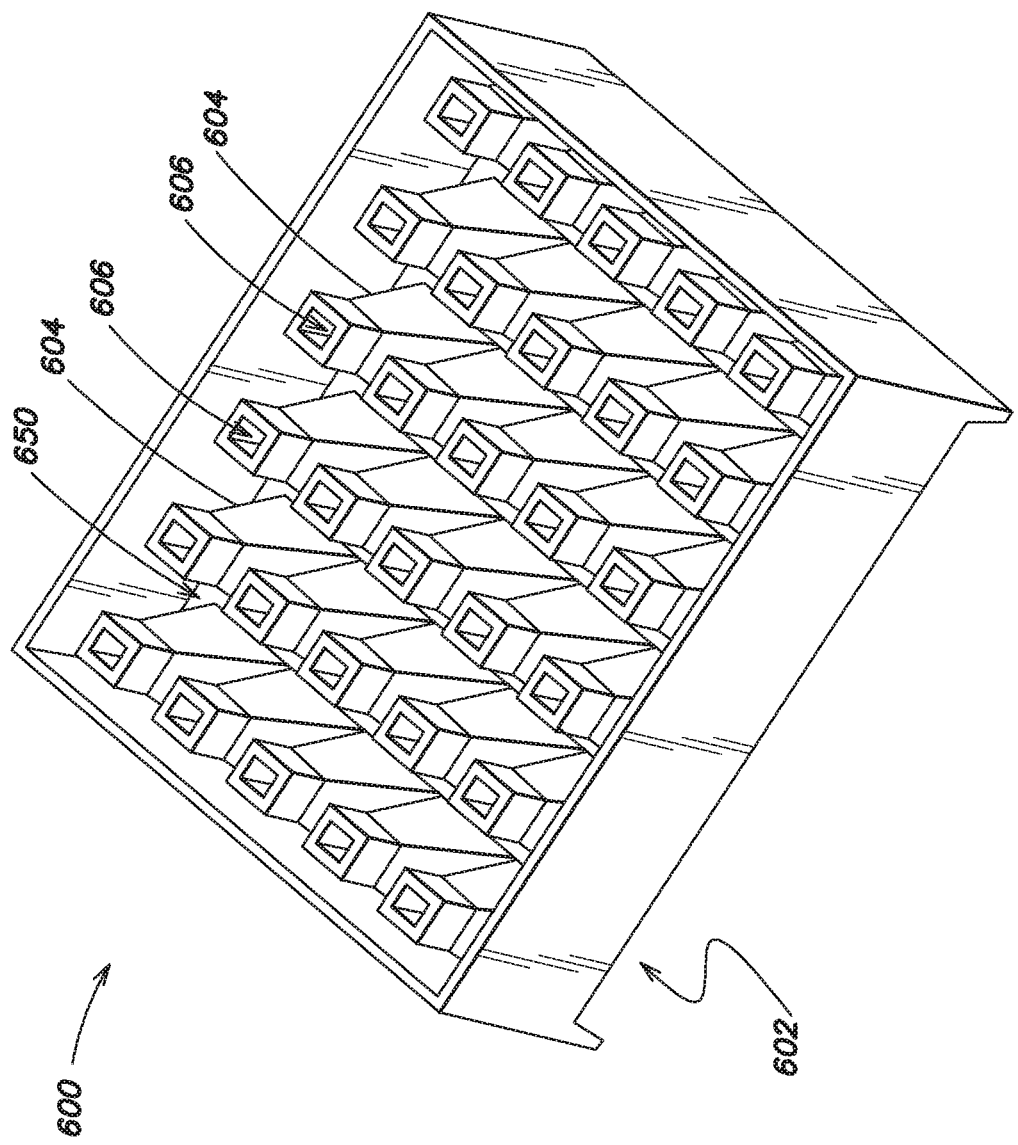

FIGS. 6A and 6B show bottom views of an apparatus 600 including bottom cavities configured as vertical channels. The apparatus 600 includes a raft body 610 supporting three tiers of cavities: a top cavity 602, an array of mid cavities 604 coupled to the top cavity 602, and an array of bottom cavities 606, each of which is coupled to a corresponding mid cavity 604. Each bottom cavity 606 is configured as a vertical channel (also referred to as a vertical pipe). In operation, the buoyancy of the apparatus 600 can be derived from at least two methods. The first method, shown in FIG. 6B, is the space 650 between the underside of the apparatus 600 and the water level. Second and third methods are shown in FIG. 1B, wherein either the raft body is comprised of an inherently buoyant material or there are one or more hollow air pockets within the structure of the raft.

Figure 7:
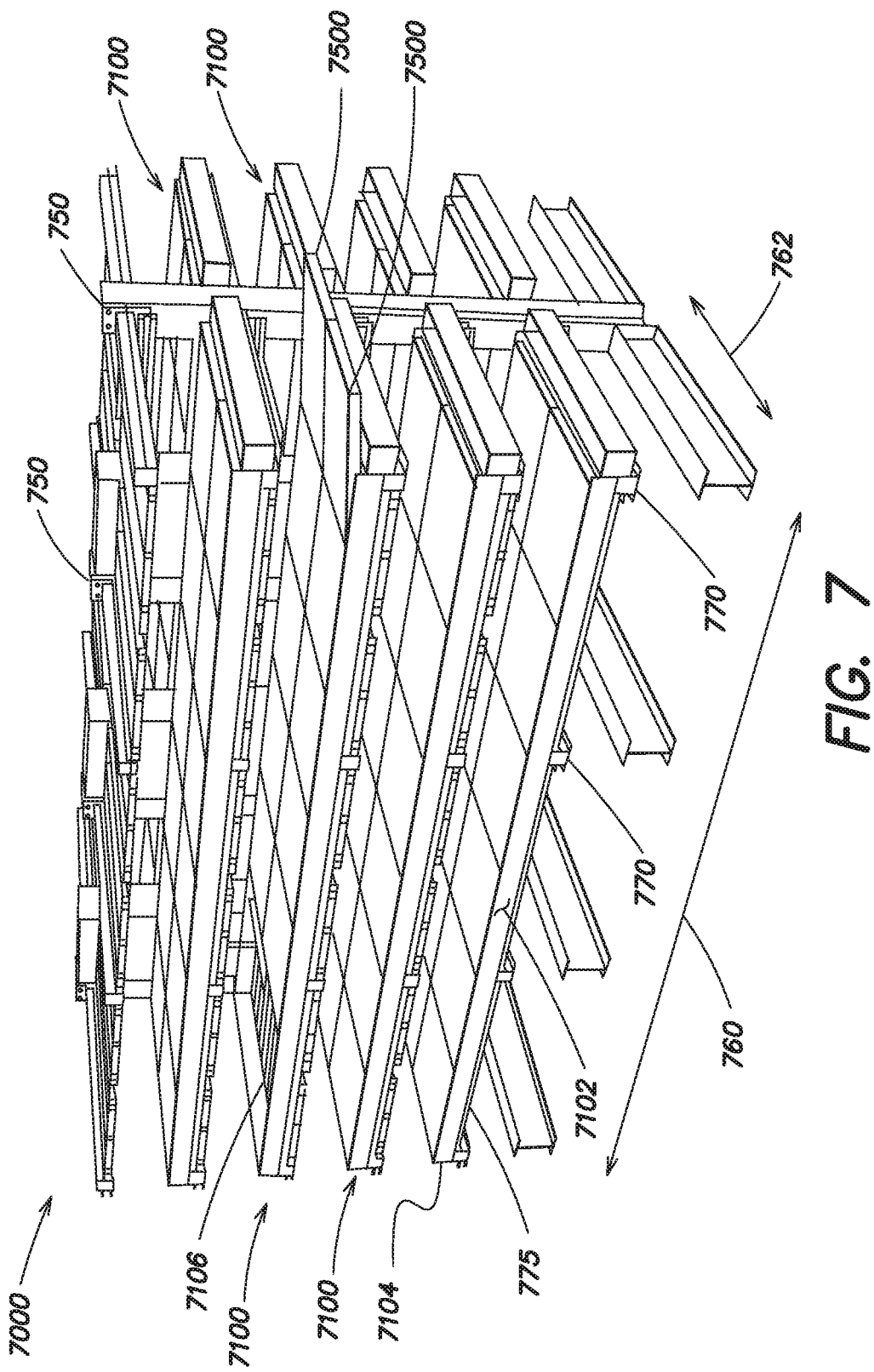
FIG. 7 shows a schematic of a cultivating system that can use the apparatus shown in FIG. 1A-6B.

Application in Water Conveyance Systems:

FIG. 7 shows a schematic of a growing system 7000 that can use the apparatus described herein for cultivating densely seeded crops. The system 7000 includes an array of vertical beams 750, each of which holds multiple horizontal shelves 7100 (also referred to as growing shelves) disposed into multiple layers vertically along the vertical beam 750. The horizontal shelf 7100 has a length 760 and a width 762. Each horizontal shelf 7100 is supported by multiple horizontal structural supports 770 mechanically coupled to a corresponding vertical beam 750.

The horizontal shelf 7100 includes decking 775, which is coupled to the multiple horizontal structural supports 770 and functions as a base or bottom for the shelf 7100. The horizontal shelf 7100 also includes at least two side walls 7102 along the length 760 of the horizontal shelf 7100 and at least two end walls 7104 along the wide 762 of the horizontal shelf 7100. The side walls 7102 and the end walls 7104 form a shallow pond when the horizontal shelf 7100 contains a plant nutrient water culture (also referred to as a culture), thereby constituting a growing layer of the growing system. Multiple rafts 7500 are used to support plants (e.g., germinated plants) that are grown in the system 7000. The rafts 7500 can float the plants above the culture, while at the same time allowing the roots of the plants to acquire nutrients from the culture underneath of the rafts 7500. The rafts 7500 can use any of the apparatus shown in FIGS. 1A-6B and described herein for cultivating densely seeded crops.

Each horizontal shelf 7100 also includes at least one ramp 7106 (underneath the two rafts 7500 angled up and moving out of the system) to facilitate loading and/or unloading of the rafts 7500 into and/or out of the shallow pond including the culture. In one example, each horizontal shelf 7100 includes a ramp 7106 at the beginning of the shelf 7100 to facilitate loading of the rafts 7500. In another example, each horizontal shelf 7100 includes a ramp 7106 at the end of the shelf 7100 to facilitate unloading of the rafts 7500. In yet another example, each horizontal shelf 7100 can include one ramp 7106 at the beginning and another ramp 7106 at the end.

The length 760 of the shelf 7100 can depend on factors such as the available space in the farm. In some examples, the length 760 of the shelf 7100 can be about 5 feet to hundreds of feet (e.g., about 5 feet, about 10 feet, about 20 feet, about 50 feet, about 100 feet, about 200 feet, about 300 feet, or about 500 feet, including any values and sub ranges in between). Multiple vertical beams 750 can be used to construct a long shelf 100. The spacing between adjacent vertical beams 750 can be about 5 feet to about 20 feet (e.g., about 5 feet, about 10 feet, about 15 feet, or about 20 feet, including any values and sub ranges in between).

The width 762 of the shelf 7100 can be about 3 feet to about 6 feet (e.g., about 3 feet, about 3.5 feet, about 4 feet, about 4.5 feet, about 5 feet, about 5.5 feet, or about 6 feet, including any values and sub ranges in between). In one example, the width 762 of the shelf 7100 can hold only one raft 7500, in which case the width of the raft 7500 is substantially similar to the width 762 of the shelf 7100. In another example, the width 762 of the shelf 7100 can hold more than one raft 7500 (e.g., two rafts, three rafts, or more).

The depth of the shallow pond in the shelf 7100 can be substantially equal to or less than 6 inches (e.g., about 6 inches, about 5.5 inches, about 5 inches, or less, including any values and sub ranges in between). The shallow pond can reduce the amount of water used in each shelf 7100, thereby facilitating the construction of multiple shelves 7100 within each system 7000. In some examples, the system 7000 can include four or more shelves 7100 (e.g., 4 shelves, 5 shelves, 6 shelves, 7 shelves, 8 shelves, 9 shelves, 10 shelves, or more).

The spacing between adjacent shelves 7100 can be substantially equal to or less than 18 inches (e.g., about 18 inches, about 16 inches, about 14 inches, about 12 inches, about 10 inches, or less, including any values and sub ranges in between). In one example, the multiple shelves 7100 are disposed vertically in a periodic manner, i.e. the spacing between adjacent shelves is fixed. In another example, the multiple shelves 7100 can have more than one spacing between adjacent shelves 7100. For example, the first two shelves can have a first spacing and the next two shelves can have another spacing. This multi-spacing configuration can accommodate, for example, growth of different plants on different levels in the system 7000.

The rafts 7500 as used in the system 7000 can be made of foam, plastics, or any other material that can float on water. The thickness of the rafts 7500 can be substantially equal to or less than 8 inches (e.g., about 8 inches, about 7 inches, about 6 inches, about 5 inches, about 4 inches, about 3.5 inches, about 3 inches, or less, including any values and sub ranges in between). The rafts 7500 can have a rectangular shape to maximize the use of the space in the shelves 7100. The length of each raft 7500 can be, for example, about 10 inches to about 50 inches (e.g., about 10 inches, about 20 inches, about 30 inches, about 40 inches, or about 50 inches, including any values and sub ranges in between). The width of each raft 7500 can be, for example, about 5 inches to about 48 inches or the full width of the pond (e.g., about 5 inches, about 10 inches, about 20 inches, about 30 inches, about 40 inches, or about 48 inches, including any values and sub ranges in between).

In one example, the side walls 7102 can be part of the decking 775. In this case, each shelf 100 can include multiple decking 775 disposed and aligned along the length 760. In another example, the decking 775 can include only the bottom of the shelf 7100 and the side walls 7102 can be assembled separately. The material of the decking 775 can include, for example, metal (e.g., aluminum or steel), plastic, or glass. More details about shallow-water flow systems can be found in PCT Application No. PCT/US2017/028999, filed Apr. 21, 2017, entitled "STACKED SHALLOW WATER CULTURE (SSWC) GROWING SYSTEMS, APPARATUS AND METHODS," which is hereby incorporated herein by reference in its entirety.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A horticultural raft, comprising:
a buoyant raft body having a top-facing non-seedbearing perimeter edge that defines a top face of the raft;
at least a first top cavity in the buoyant raft body at the top face of the raft and having:
a first top cavity upper face that includes at least a portion of the top face of the raft defined by the top-facing non-seedbearing perimeter edge, the first top cavity upper face having a first projected area;
a first top cavity lower face having a second projected area, wherein the second projected area is contained within or equal to the first projected area of the first top cavity upper face; and
a first depth, from the top-facing non-seedbearing perimeter edge to the first top cavity lower face, to contain at least one porous horticultural growing medium, wherein the first top cavity upper face provides a seeding pattern in the at least one porous horticultural growing medium, when present in the first top cavity, having two degrees of freedom along the portion of the top face of the raft such that the first top cavity provides a growing bed; and
a first plurality of mid cavities in the buoyant raft body and coupled to the first top cavity so as to also contain the at least one porous horticultural growing medium, wherein:
the first plurality of mid cavities is arranged as a two-dimensional pattern of individual compartments coupled to the first top cavity;
a mid cavity upper face of each mid cavity of the first plurality of mid cavities has a third projected area that is entirely contained within the second projected area of the first top cavity lower face of the first top cavity;
a mid cavity lower face of each mid cavity of the first plurality of mid cavities has a fourth projected area that is an opening entirely contained within the third projected area of the mid cavity upper face; and
at least a first mid cavity of the first plurality of mid cavities has a second depth from a first upper face of the first mid cavity to a first lower face of the first mid cavity such that the first lower face of the first mid cavity is a first opening that contacts a nutrient solution when the raft is floating in the nutrient solution to allow germinants in the at least one porous horticultural growing medium, when present in the raft, to communicate via capillary action with the nutrient solution, wherein the second depth of at least the first mid cavity provides a sufficient capillary distance between a safe seeding zone for the germinants in the at least one porous horticultural medium when present in the first top cavity of the raft and the nutrient solution when the raft is floating in the nutrient solution to sufficiently mitigate hyperhydration and asphyxiation at respective root-stem junctions of the germinants.

2. The raft of claim 1, wherein the second depth of at least the first mid cavity avoids substantially submerging the at least one porous horticultural medium when present in the first mid cavity and when the raft is floating in the nutrient solution.

3. The raft of claim 1, wherein the first top cavity upper face is one of a rectangle, an ellipse and a polygon.

4. The raft of claim 1, further comprising a plurality of top cavities including the first top cavity, wherein respective top cavities of the plurality of top cavities provide separate growing beds.

5. The raft of claim 4, wherein each top cavity of the plurality of top cavities is coupled to a corresponding plurality of mid cavities.

6. The raft of claim 1, further comprising the at least one porous horticultural growing medium that continuously and fully fills at least the first top cavity and the plurality of mid cavities, wherein the at least one porous horticultural growing medium includes at least one of at least one membrane, a foam, a gel, a pourable granular medium and a textile.

7. The raft of claim 6, wherein the at least one porous horticultural growing medium includes the pourable granular medium and at least one of the gel, the foam and the textile.

8. The raft of claim 6, wherein the at least one porous horticultural growing medium includes the pourable granular medium and the at least one membrane.

9. The raft of claim 1, further comprising at least one of a mesh, a screen, or netting to prevent downwards fall-through of the at least one porous horticultural growing medium when present in the raft.

10. The raft of claim 1, wherein the rail body is at least one of:
constructed from a buoyant solid matrix;
configured to include at least one first air pocket integral to the raft body; and/or
shaped so as to trap air in at least one second air pocket between a lower surface of the raft and the nutrient solution when the raft is floating in the nutrient solution.

11. The raft of claim 1, further comprising:
a plurality of bottom cavities, wherein each bottom cavity of the plurality of bottom cavities is coupled to a corresponding mid cavity of the plurality of mid cavities.

12. The raft of claim 11, wherein at least some of the bottom cavities of the plurality of bottom cavities have a form of a vertical channel, a collar, or a lip.

13. The raft of claim 12, wherein at least some of the plurality of bottom cavities are sized and arranged with respect to the plurality of mid cavities to provide respective channels to conduct the nutrient solution to the at least one porous horticultural growing medium when present in the plurality of mid cavities, and when the raft is floating in the nutrient solution.

14. The raft of claim 1, further comprising at least one of a plurality of feet, a plurality of ridges and a plurality of nipples disposed on an underside of the raft body.

15. The raft of claim 1, wherein the first top cavity includes at least one vertical ridge protruding inwards along at least one interior side of the first top cavity to facilitate a downward extension of plant roots of the germinants when present in the raft.

16. The raft of claim 1, wherein at least one of the plurality of mid cavities includes at least one vertical ridge protruding inwards along at least one interior side of the at least one of the plurality of mid cavities to facilitate a downward extension of plant roots of the germinants when present in the raft.

17. The raft of claim 1, further comprising a plurality of interlocking components coupled to the raft body to facilitate reversible interlocking of the raft to at least one other raft, wherein the plurality of interlocking components comprises at least one of physical ties, magnetic ties, rods, stakes, tabs, and grooves.

18. The raft of claim 1, further comprising a plurality of contact points disposed on the raft body to facilitate at least one of robotic and manual handling of the raft.

19. The raft of claim 18, wherein the plurality of contact points comprises a plurality of indentations in the raft body.

20. A horticultural container, comprising:
  a body having a top-facing non-seedbearing perimeter edge that defines a top face of the container;
  at least a first top cavity at the top face of the container and having:
    a first top cavity upper face that includes at least a portion of the top face of the container defined by the top-facing non-seedbearing perimeter edge, the first top cavity upper face having a first projected area;
    a first top cavity lower face having a second projected area; and
    a first depth, from the top-facing non-seedbearing perimeter edge to the first top cavity lower face, to contain at least one horticultural growing medium, wherein the first top cavity upper face provides a seeding pattern in the at least one horticultural growing medium, when present in the first top cavity, having one degree of freedom or two degrees of freedom along the portion of the top face of the container;
  a plurality of mid cavities coupled to the first top cavity so as to also contain the at least one porous horticultural growing medium, wherein:
    the plurality of mid cavities is arranged as a one-dimensional or two-dimensional pattern of individual compartments coupled to the first top cavity;
    a mid cavity upper face of each mid cavity of the first plurality of mid cavities has a third projected area that is entirely contained within the second projected area of the first top cavity lower face of the first top cavity; and
    a mid cavity lower face of each mid cavity of the plurality of mid cavities has a fourth projected area that is entirely contained within the third projected area of the mid cavity upper face; and
  a plurality of bottom cavities, wherein each bottom cavity of the plurality of bottom cavities is coupled to a corresponding mid cavity of the first plurality of mid cavities and has a bottom cavity lower face that is an opening.

21. The horticultural container of claim 20, wherein:
  at least some mid cavities of the first plurality of mid cavities include at least one vertical ridge protruding inwards along at least one interior side of the mid cavity.

22. The horticultural container of claim 20, wherein a top cavity shape of the first top cavity is one of a rectangular prism and a downwards tapered trapezoidal prism.

23. The horticultural container of claim 20, further comprising the at least one horticultural growing medium that continuously and fully fills at least the first top cavity and the first plurality of mid cavities, wherein the at least one horticultural growing medium includes at least one of a membrane, a foam, a gel, a pourable granular medium and a textile.

24. The horticultural container of claim 20, further comprising at least one of a mesh, a screen, or netting to prevent downwards fall-through of the at least one horticultural growing medium when present in the container.

25. The horticultural container of claim 24, wherein:
  the at least one of the mesh, the screen, or the netting includes a plurality of meshes, screens, or nettings; and
  each of the plurality of meshes, screens, or nettings is at the mid cavity lower face of each mid cavity or at the opening in the bottom cavity lower face of each bottom cavity.

26. The horticultural container of claim 25, wherein a shape of at least some of the bottom cavities of the plurality of bottom cavities is one of a rectangular prism, a cylinder, a downwards tapered trapezoidal prism, an upwards tapered trapezoidal prism, a downward tapered truncated elliptic cone and an upward tapered truncated elliptic cone.

27. The horticultural container of claim 25, wherein at least some of the bottom cavities of the plurality of bottom cavities have a form of a vertical channel.

28. The horticultural container of claim 25, wherein at least some of the bottom cavities of the plurality of bottom cavities have a form of a collar or a lip.

* * * * *